United States Patent
Prakash

(10) Patent No.: US 8,331,285 B2
(45) Date of Patent: Dec. 11, 2012

(54) METHOD AND APPARATUS OF ESTABLISHING ACCESS CHANNEL IN WIRELESS COMMUNICATION SYSTEMS

(75) Inventor: Rajat Prakash, La Jolla, CA (US)

(73) Assignee: Qualcomm Incorporated, San Diego, CA (US)

(*) Notice: Subject to any disclaimer, the term of this patent is extended or adjusted under 35 U.S.C. 154(b) by 1067 days.

(21) Appl. No.: 12/091,513

(22) PCT Filed: Oct. 27, 2006

(86) PCT No.: PCT/US2006/041971
§ 371 (c)(1), (2), (4) Date: Oct. 1, 2008

(87) PCT Pub. No.: WO2007/050870
PCT Pub. Date: May 3, 2007

(65) Prior Publication Data
US 2009/0175217 A1 Jul. 9, 2009

Related U.S. Application Data

(60) Provisional application No. 60/731,037, filed on Oct. 27, 2005.

(51) Int. Cl.
*H04W 4/00* (2009.01)
(52) U.S. Cl. .................................. 370/328; 370/331
(58) Field of Classification Search .............. 370/328, 370/331
See application file for complete search history.

(56) References Cited

U.S. PATENT DOCUMENTS

| | | | |
|---|---|---|---|
| 5,021,777 A | 6/1991 | Gross et al. | |
| 5,196,728 A | 3/1993 | Jaux | |
| 5,267,261 A | 11/1993 | Blakeney, II et al. | |
| 5,276,911 A | 1/1994 | Levine et al. | |
| 5,289,527 A | 2/1994 | Tiedemann, Jr. | |
| 5,406,613 A | 4/1995 | Peponides et al. | |
| 5,490,139 A | 2/1996 | Baker et al. | |
| 5,640,414 A | 6/1997 | Blakeney, II et al. | |
| 5,678,192 A | 10/1997 | Paavonen et al. | |

(Continued)

FOREIGN PATENT DOCUMENTS

CA 2340201 A1 1/2001

(Continued)

OTHER PUBLICATIONS

European Office Action dated Oct. 4, 2010, for European Patent Application Serial No. 06826853.1, 7 pages.

(Continued)

*Primary Examiner* — Sai-Ming Chan
(74) *Attorney, Agent, or Firm* — Fulbright & Jaworski L.L.P.

(57) ABSTRACT

A method and apparatus for establishing an access channel in a wireless communication system is provided, comprising receiving an AccessGrant on a carrier on which the last probe was transmitted and ending an access probe transmission upon receiving the AccessGrant. A method and apparatus is further provided, comprising determining expiration of an access grant timer and ending an access probe transmission upon the expiration of the timer. A method and apparatus is further provided comprising receiving an IdleState.IdleHO indication and ending an access probe transmission upon receiving the IdleState.IdleHO indication. A method and apparatus is further provided receiving a new AttemptAccess command, wherein the AttemptAccess command is processed after a current probe transmission ends and ending an access probe transmission on receiving the new AttemptAccess command.

16 Claims, 6 Drawing Sheets

U.S. PATENT DOCUMENTS

| | | |
|---|---|---|
| 5,802,467 A | 9/1998 | Salazar et al. |
| 5,815,507 A | 9/1998 | Vinggaard et al. |
| 5,818,825 A * | 10/1998 | Corrigan et al. ............... 370/329 |
| 5,818,842 A | 10/1998 | Burwell et al. |
| 5,825,752 A | 10/1998 | Fujimori et al. |
| 5,878,033 A | 3/1999 | Mouly |
| 5,913,168 A | 6/1999 | Moreau et al. |
| 5,946,292 A | 8/1999 | Tsujishita et al. |
| 6,006,073 A | 12/1999 | Glauner et al. |
| 6,012,160 A | 1/2000 | Dent |
| 6,038,220 A | 3/2000 | Kang et al. |
| 6,047,189 A | 4/2000 | Yun et al. |
| 6,115,667 A | 9/2000 | Nakamura |
| 6,118,767 A | 9/2000 | Shen et al. |
| 6,119,005 A | 9/2000 | Smolik |
| 6,128,290 A | 10/2000 | Carvey |
| 6,144,841 A | 11/2000 | Feeney |
| 6,144,861 A | 11/2000 | Sundelin et al. |
| 6,154,659 A | 11/2000 | Jalali et al. |
| 6,157,621 A | 12/2000 | Brown et al. |
| 6,167,248 A | 12/2000 | Hamalainen et al. |
| 6,169,768 B1 | 1/2001 | Okada et al. |
| 6,175,550 B1 | 1/2001 | Van Nee |
| 6,181,738 B1 | 1/2001 | Chheda et al. |
| 6,181,768 B1 | 1/2001 | Berliner |
| 6,208,699 B1 | 3/2001 | Chen et al. |
| 6,212,175 B1 | 4/2001 | Harsch |
| 6,216,004 B1 | 4/2001 | Tiedemann, Jr. et al. |
| 6,229,800 B1 | 5/2001 | Thompson et al. |
| 6,249,681 B1 | 6/2001 | Virtanen |
| 6,252,865 B1 | 6/2001 | Walton et al. |
| 6,266,529 B1 | 7/2001 | Chheda |
| 6,272,335 B1 | 8/2001 | Nakayama et al. |
| 6,278,882 B1 | 8/2001 | Choi |
| 6,300,864 B1 | 10/2001 | Willey |
| 6,307,846 B1 | 10/2001 | Willey |
| 6,320,855 B1 | 11/2001 | Shi |
| 6,359,900 B1 | 3/2002 | Dinakar et al. |
| 6,366,779 B1 | 4/2002 | Bender et al. |
| 6,389,034 B1 | 5/2002 | Guo et al. |
| 6,421,540 B1 | 7/2002 | Gilhousen et al. |
| 6,446,236 B1 | 9/2002 | McEwen et al. |
| 6,477,361 B1 | 11/2002 | LaGrotta et al. |
| 6,480,504 B1 | 11/2002 | Wang et al. |
| 6,483,826 B1 | 11/2002 | Aakerberg |
| 6,493,338 B1 | 12/2002 | Preston et al. |
| 6,519,705 B1 | 2/2003 | Leung |
| 6,532,227 B1 | 3/2003 | Leppisaari et al. |
| 6,535,736 B1 | 3/2003 | Balogh et al. |
| 6,539,030 B1 | 3/2003 | Bender et al. |
| 6,560,774 B1 | 5/2003 | Gordon et al. |
| 6,570,915 B1 | 5/2003 | Sweitzer et al. |
| 6,571,084 B1 | 5/2003 | Jabbary |
| 6,577,608 B1 | 6/2003 | Moon et al. |
| 6,580,726 B1 | 6/2003 | Kumpf et al. |
| 6,597,705 B1 | 7/2003 | Rezaiifar et al. |
| 6,597,923 B1 | 7/2003 | Vanghi et al. |
| 6,603,746 B1 | 8/2003 | Larijani et al. |
| 6,628,956 B2 | 9/2003 | Bark et al. |
| 6,633,554 B1 * | 10/2003 | Dalal ............................ 370/331 |
| 6,643,520 B1 | 11/2003 | Park et al. |
| 6,684,080 B1 | 1/2004 | Barnes et al. |
| 6,687,285 B1 | 2/2004 | Jou |
| 6,711,150 B1 | 3/2004 | Vanghi |
| 6,714,511 B1 | 3/2004 | Sudo et al. |
| 6,721,373 B1 | 4/2004 | Frenkel et al. |
| 6,731,943 B1 | 5/2004 | McCormick et al. |
| 6,754,229 B1 | 6/2004 | Islam et al. |
| 6,788,937 B1 | 9/2004 | Willenegger et al. |
| 6,795,425 B1 | 9/2004 | Raith |
| 6,807,164 B1 | 10/2004 | Almgren et al. |
| 6,813,252 B2 | 11/2004 | Chang et al. |
| 6,813,269 B1 | 11/2004 | Clougherty et al. |
| 6,823,192 B2 | 11/2004 | Jou et al. |
| 6,829,493 B1 | 12/2004 | Hunzinger |
| 6,842,619 B2 | 1/2005 | Lee et al. |
| 6,850,499 B2 | 2/2005 | Wheatley, III |
| 6,937,700 B1 | 8/2005 | Jang |
| 6,944,146 B1 | 9/2005 | Barany et al. |
| 6,950,669 B2 | 9/2005 | Simonsson |
| 6,952,591 B2 | 10/2005 | Budka et al. |
| 6,963,540 B2 | 11/2005 | Choi et al. |
| 6,967,936 B1 | 11/2005 | Laroia et al. |
| 6,996,131 B1 | 2/2006 | Islam et al. |
| 6,996,391 B2 | 2/2006 | Hunzinger |
| 7,006,477 B1 | 2/2006 | Balachandran et al. |
| 7,046,966 B2 | 5/2006 | Davis |
| 7,058,031 B2 | 6/2006 | Bender et al. |
| 7,072,307 B2 | 7/2006 | Tong et al. |
| 7,110,391 B1 | 9/2006 | Rogers et al. |
| 7,139,575 B1 | 11/2006 | Chen et al. |
| 7,197,692 B2 | 3/2007 | Sutivong et al. |
| 7,203,512 B2 | 4/2007 | Jeong et al. |
| 7,212,831 B2 | 5/2007 | Lee |
| 7,224,993 B2 | 5/2007 | Meyers et al. |
| 7,233,625 B2 | 6/2007 | Ma et al. |
| 7,313,167 B2 | 12/2007 | Yoon et al. |
| 7,313,398 B1 | 12/2007 | Ramahi |
| 7,320,003 B2 | 1/2008 | Perry et al. |
| 7,336,953 B2 | 2/2008 | Kim et al. |
| 7,340,615 B2 | 3/2008 | Krantz et al. |
| 7,342,901 B1 | 3/2008 | Zhang et al. |
| 7,383,432 B1 | 6/2008 | Barnes et al. |
| 7,403,528 B2 | 7/2008 | Hu et al. |
| 7,415,041 B2 | 8/2008 | Harris |
| 7,420,939 B2 | 9/2008 | Laroia et al. |
| 7,466,665 B2 | 12/2008 | Calcev et al. |
| 7,496,058 B2 | 2/2009 | Kim et al. |
| 7,522,919 B2 | 4/2009 | Yoon et al. |
| 7,567,826 B2 | 7/2009 | Sugaya |
| 7,590,095 B2 | 9/2009 | Chen et al. |
| 7,620,018 B2 | 11/2009 | Tee et al. |
| 7,768,960 B1 | 8/2010 | Barratt |
| 7,782,807 B2 | 8/2010 | Yoon et al. |
| 7,782,831 B1 | 8/2010 | Feeney |
| 7,818,013 B2 | 10/2010 | Li et al. |
| 7,881,245 B2 | 2/2011 | Vijayan et al. |
| 7,957,483 B2 | 6/2011 | Yu et al. |
| 7,987,505 B2 | 7/2011 | Vadlapudi et al. |
| 8,000,257 B2 | 8/2011 | An et al. |
| 8,027,302 B2 | 9/2011 | Prakash et al. |
| 8,032,145 B2 | 10/2011 | Ji |
| 8,036,669 B2 | 10/2011 | Dong et al. |
| 2001/0029181 A1 | 10/2001 | Verkama |
| 2001/0034233 A1 | 10/2001 | Tiedemann, Jr. et al. |
| 2001/0054959 A1 | 12/2001 | Horn et al. |
| 2002/0003780 A1 | 1/2002 | Braun et al. |
| 2002/0018450 A1 * | 2/2002 | McKenna et al. ............. 370/328 |
| 2002/0022487 A1 | 2/2002 | Ahn |
| 2002/0058528 A1 | 5/2002 | Hunzinger |
| 2002/0061749 A1 | 5/2002 | Hunzinger |
| 2002/0087720 A1 | 7/2002 | Davis et al. |
| 2002/0093920 A1 | 7/2002 | Neufeld et al. |
| 2002/0123358 A1 | 9/2002 | Butler et al. |
| 2002/0126641 A1 | 9/2002 | Bender |
| 2002/0137535 A1 | 9/2002 | Hunzinger |
| 2002/0142776 A1 | 10/2002 | Tiedemann, Jr. |
| 2002/0154610 A1 | 10/2002 | Tiedemann, Jr. et al. |
| 2002/0163894 A1 | 11/2002 | Alapuranen et al. |
| 2002/0168984 A1 | 11/2002 | Wallentin |
| 2002/0181423 A1 | 12/2002 | Chen et al. |
| 2002/0181509 A1 | 12/2002 | Mody et al. |
| 2003/0016702 A1 | 1/2003 | Bender et al. |
| 2003/0031140 A1 | 2/2003 | Oprescu-Surcobe et al. |
| 2003/0039267 A1 | 2/2003 | Koo et al. |
| 2003/0058818 A1 | 3/2003 | Wilkes et al. |
| 2003/0086366 A1 | 5/2003 | Branlund et al. |
| 2003/0086385 A1 | 5/2003 | Kwon et al. |
| 2003/0112829 A1 | 6/2003 | Sridhar |
| 2003/0115369 A1 | 6/2003 | Walter et al. |
| 2003/0123383 A1 | 7/2003 | Korobkov et al. |
| 2003/0133494 A1 | 7/2003 | Bender et al. |
| 2003/0144000 A1 | 7/2003 | Glazko et al. |
| 2003/0152049 A1 | 8/2003 | Turner |
| 2003/0189932 A1 | 10/2003 | Ishikawa et al. |
| 2003/0207692 A1 | 11/2003 | Goldberg |
| 2003/0218973 A1 | 11/2003 | Oprea et al. |

| | | | | | | |
|---|---|---|---|---|---|---|
| 2003/0232621 | A1 | 12/2003 | Brooks | 2006/0227891 A1 | 10/2006 | Niu et al. |
| 2004/0002340 | A1 | 1/2004 | Lim et al. | 2006/0245425 A1 | 11/2006 | Mathis et al. |
| 2004/0038681 | A1 | 2/2004 | Chun | 2006/0268768 A1 | 11/2006 | Harris et al. |
| 2004/0077370 | A1 | 4/2004 | Dick et al. | 2006/0280160 A1 | 12/2006 | Padovani et al. |
| 2004/0082356 | A1 | 4/2004 | Walton et al. | 2006/0285485 A1 | 12/2006 | Agrawal et al. |
| 2004/0121771 | A1 | 6/2004 | Song et al. | 2006/0285558 A1 | 12/2006 | Dottling et al. |
| 2004/0127244 | A1 | 7/2004 | Matsumoto et al. | 2006/0286974 A1 | 12/2006 | Gore et al. |
| 2004/0143791 | A1 | 7/2004 | Ito et al. | 2006/0291577 A1 | 12/2006 | Boariu |
| 2004/0146030 | A1 | 7/2004 | Hsieh et al. | 2007/0022441 A1 | 1/2007 | Nystrom et al. |
| 2004/0151231 | A1 | 8/2004 | Li et al. | 2007/0060126 A1 | 3/2007 | Taniguchi et al. |
| 2004/0152481 | A1 | 8/2004 | Georgeaux et al. | 2007/0064588 A1 | 3/2007 | Kisoda et al. |
| 2004/0160922 | A1 | 8/2004 | Nanda et al. | 2007/0076682 A1 | 4/2007 | Kim et al. |
| 2004/0174928 | A1 | 9/2004 | Siwiak et al. | 2007/0087767 A1 | 4/2007 | Pareek et al. |
| 2004/0180661 | A1 | 9/2004 | Chen et al. | 2007/0091817 A1 | 4/2007 | Yoon et al. |
| 2004/0185879 | A1 | 9/2004 | Kong et al. | 2007/0110000 A1 | 5/2007 | Abedi |
| 2004/0193971 | A1 | 9/2004 | Soong et al. | 2007/0133476 A1 | 6/2007 | Li et al. |
| 2004/0203855 | A1 | 10/2004 | Veerasamy et al. | 2007/0159957 A1 | 7/2007 | Ljung et al. |
| 2004/0213214 | A1 | 10/2004 | Jung et al. | 2007/0217387 A1 | 9/2007 | Choi et al. |
| 2004/0221218 | A1 | 11/2004 | Grob et al. | 2008/0056183 A1 | 3/2008 | Gorokhov et al. |
| 2004/0229605 | A1 | 11/2004 | Hwang et al. | 2008/0056188 A1 | 3/2008 | Lu et al. |
| 2004/0252659 | A1 | 12/2004 | Yun et al. | 2008/0076432 A1 | 3/2008 | Senarath et al. |
| 2004/0258096 | A1 | 12/2004 | Yoon et al. | 2008/0117842 A1 | 5/2008 | Rao |
| 2004/0259528 | A1* | 12/2004 | Gandhi et al. ............... 455/411 | 2008/0123542 A1 | 5/2008 | Karlsson |
| 2004/0264548 | A1 | 12/2004 | Miyoshi | 2008/0188214 A1 | 8/2008 | Qi |
| 2005/0030911 | A1 | 2/2005 | Tiedemann, Jr. et al. | 2008/0259811 A1 | 10/2008 | Cordeiro et al. |
| 2005/0031047 | A1 | 2/2005 | Maltsev et al. | 2008/0271138 A1 | 10/2008 | Chen et al. |
| 2005/0047361 | A1 | 3/2005 | Fudim et al. | 2009/0129325 A1 | 5/2009 | Prakash et al. |
| 2005/0049013 | A1 | 3/2005 | Chang et al. | 2009/0258648 A1 | 10/2009 | Willey |
| 2005/0054389 | A1 | 3/2005 | Lee et al. | 2010/0002597 A1 | 1/2010 | Sampath et al. |
| 2005/0058089 | A1 | 3/2005 | Vijayan et al. | 2010/0034101 A1 | 2/2010 | Ayman Naguib |
| 2005/0063298 | A1 | 3/2005 | Ling et al. | 2010/0232293 A1 | 9/2010 | Sagfors et al. |
| 2005/0078641 | A1 | 4/2005 | Kim | | | |
| 2005/0094576 | A1 | 5/2005 | Fonseca et al. | FOREIGN PATENT DOCUMENTS | | |
| 2005/0111397 | A1 | 5/2005 | Attar et al. | CN | 1346580 A | 4/2002 |
| 2005/0111406 | A1 | 5/2005 | Pasanen et al. | CN | 1350730 A | 5/2002 |
| 2005/0113023 | A1 | 5/2005 | Bassompiere et al. | CN | 1666448 A | 9/2005 |
| 2005/0117537 | A1 | 6/2005 | Okabe | CN | 1496636 | 7/2006 |
| 2005/0118981 | A1 | 6/2005 | Laroia et al. | EP | 0475698 | 3/1992 |
| 2005/0124362 | A1 | 6/2005 | Pecen et al. | EP | 0687078 A2 | 12/1995 |
| 2005/0128964 | A1 | 6/2005 | Tiedemann, Jr. et al. | EP | 0869647 A2 | 10/1998 |
| 2005/0128993 | A1 | 6/2005 | Yu et al. | EP | 0955736 A2 | 11/1999 |
| 2005/0135282 | A1 | 6/2005 | Miyoshi et al. | EP | 1052866 | 11/2000 |
| 2005/0135308 | A1 | 6/2005 | Vijayan et al. | EP | 1124347 A2 | 8/2001 |
| 2005/0135403 | A1 | 6/2005 | Ketchum et al. | EP | 1158685 A1 | 11/2001 |
| 2005/0152328 | A1 | 7/2005 | Sadri et al. | EP | 1202591 A2 | 5/2002 |
| 2005/0164709 | A1 | 7/2005 | Balasubramanian et al. | EP | 1223775 | 7/2002 |
| 2005/0165949 | A1 | 7/2005 | Teague | EP | 1315310 A2 | 5/2003 |
| 2005/0180362 | A1 | 8/2005 | Chin et al. | EP | 1388964 A1 | 2/2004 |
| 2005/0201309 | A1 | 9/2005 | Kang et al. | EP | 1458209 A2 | 9/2004 |
| 2005/0221833 | A1 | 10/2005 | Granzow et al. | EP | 1471760 A2 | 10/2004 |
| 2005/0232181 | A1 | 10/2005 | Park et al. | EP | 1487230 A1 | 12/2004 |
| 2005/0233729 | A1 | 10/2005 | Stojanovski et al. | EP | 1513282 A2 | 3/2005 |
| 2005/0249181 | A1 | 11/2005 | Vijayan et al. | EP | 1534039 | 5/2005 |
| 2005/0249187 | A1 | 11/2005 | Cho et al. | EP | 1004217 | 6/2005 |
| 2005/0265346 | A1 | 12/2005 | Ho et al. | EP | 1583309 A2 | 10/2005 |
| 2005/0266846 | A1 | 12/2005 | Kim | EP | 1587233 | 10/2005 |
| 2005/0271027 | A1 | 12/2005 | Kim et al. | EP | 1678906 A1 | 7/2006 |
| 2005/0281226 | A1 | 12/2005 | Lee et al. | EP | 1714416 | 10/2006 |
| 2005/0281269 | A1 | 12/2005 | Choi | EP | 1949730 | 7/2008 |
| 2006/0014542 | A1 | 1/2006 | Khandekar et al. | JP | 0722998 | 1/1995 |
| 2006/0018249 | A1 | 1/2006 | Shearer et al. | JP | 7504552 T | 5/1995 |
| 2006/0019677 | A1 | 1/2006 | Teague et al. | JP | 7226724 A2 | 8/1995 |
| 2006/0019694 | A1 | 1/2006 | Sutivong et al. | JP | 8172671 | 7/1996 |
| 2006/0034208 | A1 | 2/2006 | Blouin | JP | 8242218 A | 9/1996 |
| 2006/0034244 | A1 | 2/2006 | Huang et al. | JP | 9509547 | 9/1997 |
| 2006/0046762 | A1 | 3/2006 | Yoon et al. | JP | 10155179 A | 6/1998 |
| 2006/0050637 | A1 | 3/2006 | Wigard et al. | JP | 10242903 A | 9/1998 |
| 2006/0062183 | A1* | 3/2006 | Forte et al. .................. 370/331 | JP | 11313370 A | 11/1999 |
| 2006/0084432 | A1 | 4/2006 | Balasubramanian et al. | JP | 2000232688 A | 8/2000 |
| 2006/0098599 | A1 | 5/2006 | Choi et al. | JP | 2001512638 T | 8/2001 |
| 2006/0099972 | A1 | 5/2006 | Nair et al. | JP | 2001274767 | 10/2001 |
| 2006/0129816 | A1 | 6/2006 | Hinton | JP | 2002010341 A | 1/2002 |
| 2006/0148493 | A1 | 7/2006 | Narasimha et al. | JP | 2002026795 A | 1/2002 |
| 2006/0183483 | A1 | 8/2006 | Hidaka | JP | 2002152129 A | 5/2002 |
| 2006/0187877 | A1 | 8/2006 | Lundby et al. | JP | 2002158609 A | 5/2002 |
| 2006/0193287 | A1 | 8/2006 | Ooshima et al. | JP | 2002300628 | 10/2002 |
| 2006/0194581 | A1 | 8/2006 | Kang et al. | JP | 2002305534 A | 10/2002 |
| 2006/0205413 | A1 | 9/2006 | Teague | JP | 2002539707 | 11/2002 |
| 2006/0223449 | A1 | 10/2006 | Sampath et al. | JP | 2002540692 | 11/2002 |

| | | | |
|---|---|---|---|
| JP | 2003500891 T | 1/2003 |
| JP | 2003110582 A | 4/2003 |
| JP | 2003517741 T | 5/2003 |
| JP | 2003525555 | 8/2003 |
| JP | 2004088180 A | 3/2004 |
| JP | 2004153619 A | 5/2004 |
| JP | 2004159235 | 6/2004 |
| JP | 2004517534 T | 6/2004 |
| JP | 2004247801 A | 9/2004 |
| JP | 2004530347 | 9/2004 |
| JP | 2004531124 | 10/2004 |
| JP | 2004532542 A | 10/2004 |
| JP | 2004328772 | 11/2004 |
| JP | 2005012806 A | 1/2005 |
| JP | 2005502218 A | 1/2005 |
| JP | 2005080312 A | 3/2005 |
| JP | 2005508588 | 3/2005 |
| JP | 2005101990 A | 4/2005 |
| JP | 2005514865 T | 5/2005 |
| JP | 2005160079 A | 6/2005 |
| JP | 2005233621 A | 9/2005 |
| JP | 2005286998 A | 10/2005 |
| JP | 2006523392 A | 10/2006 |
| KR | 20010016706 | 3/2001 |
| KR | 2001-82061 | 8/2001 |
| KR | 1020030007481 | 1/2003 |
| KR | 20040007214 | 1/2004 |
| KR | 20040050145 | 6/2004 |
| KR | 20050053787 | 6/2005 |
| KR | 20060014618 A | 2/2006 |
| RU | 2073913 | 2/1997 |
| RU | 2198465 C2 | 2/2003 |
| TV | I223532 | 11/2004 |
| TV | I223944 | 11/2004 |
| TV | I239782 | 9/2005 |
| TV | I240524 | 9/2005 |
| TW | 478269 | 3/2002 |
| TW | 531982 | 5/2003 |
| TW | 200302642 | 8/2003 |
| TW | 200501641 | 1/2005 |
| WO | WO9318601 | 9/1993 |
| WO | WO9730531 A1 | 8/1997 |
| WO | 9733399 | 9/1997 |
| WO | WO9835520 | 8/1998 |
| WO | WO98/39938 | 9/1998 |
| WO | WO9848581 A1 | 10/1998 |
| WO | WO9854919 | 12/1998 |
| WO | WO9943101 | 8/1999 |
| WO | WO0007260 A2 | 2/2000 |
| WO | WO0010353 A1 | 2/2000 |
| WO | WO0013451 | 3/2000 |
| WO | WO0014900 A1 | 3/2000 |
| WO | WO0018173 | 3/2000 |
| WO | WO0035107 | 6/2000 |
| WO | 0057663 | 9/2000 |
| WO | WO0055976 A2 | 9/2000 |
| WO | WO0057662 | 9/2000 |
| WO | WO0113669 A1 | 2/2001 |
| WO | WO0117288 A1 | 3/2001 |
| WO | WO0120808 A2 | 3/2001 |
| WO | WO0160104 | 8/2001 |
| WO | WO0176110 A2 | 10/2001 |
| WO | WO01076279 | 10/2001 |
| WO | WO0182504 | 11/2001 |
| WO | WO0197538 | 12/2001 |
| WO | WO0228120 A2 | 4/2002 |
| WO | WO0243412 | 5/2002 |
| WO | WO0247321 | 6/2002 |
| WO | WO0249305 A2 | 6/2002 |
| WO | WO02073867 | 9/2002 |
| WO | WO02080600 A1 | 10/2002 |
| WO | WO02093839 | 11/2002 |
| WO | WO03015435 | 2/2003 |
| WO | WO03043251 | 5/2003 |
| WO | WO03051076 | 6/2003 |
| WO | WO03069933 | 8/2003 |
| WO | WO2004004173 | 1/2004 |
| WO | 2004032559 | 4/2004 |
| WO | WO 2004/023559 * | 4/2004 |
| WO | WO2004032548 A1 | 4/2004 |
| WO | WO2004038984 A2 | 5/2004 |
| WO | WO2004038988 | 5/2004 |
| WO | WO2004054206 A1 | 6/2004 |
| WO | WO2004073200 | 8/2004 |
| WO | WO2004077752 | 9/2004 |
| WO | WO2004077778 A1 | 9/2004 |
| WO | WO2004079949 A1 | 9/2004 |
| WO | WO2004082181 A1 | 9/2004 |
| WO | WO2004086711 | 10/2004 |
| WO | WO2004091231 A1 | 10/2004 |
| WO | WO2004100450 A1 | 11/2004 |
| WO | WO2004107796 A1 | 12/2004 |
| WO | WO2005004525 | 1/2005 |
| WO | WO2005022811 A2 | 3/2005 |
| WO | WO2005027355 | 3/2005 |
| WO | WO2005034438 | 4/2005 |
| WO | WO2005039128 | 4/2005 |
| WO | WO2005041515 | 5/2005 |
| WO | WO2005055640 | 6/2005 |
| WO | WO2005060277 | 6/2005 |
| WO | WO2005064875 | 7/2005 |
| WO | WO2005067181 A1 | 7/2005 |
| WO | WO2005071989 | 8/2005 |
| WO | WO2005074184 | 8/2005 |
| WO | WO2005079081 A1 | 8/2005 |
| WO | WO2005081444 A1 | 9/2005 |
| WO | WO2005096560 A1 | 10/2005 |
| WO | WO2006007318 A1 | 1/2006 |
| WO | WO2006023705 | 3/2006 |
| WO | WO2006069320 | 6/2006 |
| WO | WO2006099062 A1 | 9/2006 |
| WO | WO2006138556 | 12/2006 |
| WO | WO2006138573 | 12/2006 |
| WO | WO2007050876 | 5/2007 |
| WO | WO2007050939 | 5/2007 |

OTHER PUBLICATIONS

Korean Office Action dated Mar. 19, 2010, for Korean Patent Application Serial No. 2008-7012456, 4 pages.
International Search Report and Written Opinion mailed Sep. 7, 2007, for PCT Application Serial No. PCT/US2006/041971, 18 pages.
Tomcik, Jim. "MBFDD and MBTDD Wideband Mode: Technology Overview" IEEE 802.80 Working Group on Mobile Broadband Wireless Access, Jan. 2006, pp. 1-79.
Chinese Office Action dated Feb. 18, 2011, for Chinese Patent Application Serial No. 200680049274.3, 6 pages.
Japanese Office Action dated Feb. 8, 2011, for Japanese Patent Application Serial No. 2008-537988, 5 pages.
Chinese Office Action dated Aug. 31, 2011, for Chinese Patent Application Serial No. 200680049274.3, 7 pages.
3GPP, ETSI: Universal Mobile Telecommunications system (UMTS); Radio Resource Control (RRC); Protocol specification (3GPP TS 25.331 version 7.2.0 Release 7). ETSI TS 125 331 V.7.2.0, Sep. 2006, XP002423759.
3GPP2 "cdma2000 High Rate Packet Data Air interface Specification",3RD Generation Partnership Project 2 C.S0024, Sep. 12, 2000, pp. 1-417.
3GPP2 C: "cdma2000 High Rate Packet Data Air Interface Specification; 3GPP2 C S0024-A version 2.0," 3GPP2 CDMA2000, Jul. 2005, 43 pages, XP002422601.
3GPP2 C: "cdma2000 High Rate Packet Data Air Interface Specification; 3GPP2 C.S0024-A version 2.0," 3GPP2 CDMA2000, Jul. 2005, p. 0, 8-13-8-15, 8-101, XP002426056, p. 8-13, line 17-line 35; p. 8-14, line 15-line 32; p. 8-15, line 4-line 12; p. 8-101, line 30-line 32.
3GPP2 C: "cdma2000 High Rate Packet Data Air Interface Specification",3GPP2 C. S0024-A version 2.0, 3GPP2 CDMA2000, May 2006,1621 pages.
3GPP2. "cdma2000 High Rate Packet Data Air Interface Specification", Chapter 9—"Connection Layer", C.S0024-A, Version 1.0, Mar. 2004, 144 pages, XP002424014.
3GPP2, "cdma2000 High Rate Packet Data Air Interface Specification", C. S0024-A Version 2,0, Oct. 27, 2000, 441 pages.

3GPP2 C.S0024-0-Version 4.0 "cdma2000 High Rate Packet Data Air Interface Specification", p. 1-548, Oct. 25, 2002.

3GPP2 C.S0024-A, "cdma 2000 High Rate Packet Data Air Interface Specification", Version 2.0, 7-18, 8-29, 8-36, 8-38-8-39, 8-41,8-155-8-156, 10-1, Jul. 2005.

3GPP2 C.S0024-A, "CDMA 2000 High Rate Packet Data Air Interface Specification", Version 2.0, 8-15, 8-43, Jul. 2005.

3GPP2 C.S0024-A, "CDMA 2000 High Rate Packet Data Air Interface Specification", Version 2.0, 8-151-8-155, Jul. 2005.

3GPP2 C.S0024-A V2.0, Jul. 2005, p. 8-11-8-12, 8-29-8-31, (for information: p. 8-86-8-87, 8-101).

3GPP2 C.S0024-A V2.0, Jul. 2005, pp. 8-10 to 8-12, 8-29 to 8-32, 8-86 to 8-87, 8-106, and 8-168.

3GPP2 C.S0024-A, Version 2.0—3rd Generation Partnership Project 2; "CDMA2000 High Rate Packet Data Air Interface Specification"; Jul. 2005, 1227 pages; XP002431799.

3GPP2 C.S0038-A: "Signaling Conformance Specification for High Rate Packet Data Air Interface"; Sep. 26, 2005.

3GPP2. Medium Access Control (MAC) Standard for cdma2000 Spread Spectrum Systems, 3GPP2 C.S0003-D Version 1.0, p. '2-87'-2.92, Feb. 13, 2004, published online at [http://www.3gpp2.org/Public_html/specs/C.S0003-D.v1.0_MAC_031504.pdf] 8 pages.

3GPP2: "cdma 2000 High Rate Packet Data Air Interface Specification", 3rd Generation Partnership Project 2,3GPP2 C.S0024-A Version 2.0, pp. 8-25-8-28.

3GPP2: "cdma 2000 High Rate Packet Data Air Interface Specification", 3GPP2 C.S0024-A, Jul. 2005, Version 2.0, p. 8-26, 8-38.

3GPP2: "cdma 2000 High Rate Packet Data Air Interface Specification", 3GPP2 C.S0024-A, Sep. 2000, Version 2.0, P. 6-7-6-8.

3GPP2: "cdma2000 High Rate Packet Data Air Interface Specification", 3GPP2 C.S0024-A, Jul. 2005, Version 2.0, P. 8-151,8-157-8-169, section 8.9.1 and 8.9.6.2.1, URL, http://www.3gpp2.org/Public_html/specs/C.S0024-A_v2.0_050727.pdf.

3GPP2: "cdma2000 High Rate Packet Date Air Interface Specification", Version 2.0, 3GPP2 C.S0024-A, 8-68-8-69, Jul. 2005.

3RD Generation Partnership Project 2 "3GPP2": Medium Access Control (MAC) Standard for cdma2000 Spread Spectrum Systems, Release D; 3GPP2 CS0003-D Version 2.0, Sep. 2005 (pp. 1-230) XP002429116.

3RD Generation Partnership Project 2 "3GPP2": "Signaling Link Access Control (LAC) Standard for cdma200 Spread Spectrum Systems Revision D v2.0" 3GPP2 C.S0004-D Version 2.0, Sep. 2005, XP002427509, pp. 1-12, pp. 2-46-pp. 2-51.

802.20 Evaluation Criteria—Ver. 1.0, IEEE 802 Laniman Standards Committee, Sep. 23, 2005, pp. 18-35,URL: [http://www.ieee802.org/20/P_Docs/IEEE_802.20-PD-09.doc].

Agilent Technologies: Performing Base Station Over—Air Maintenance with the Agilent E6474A CDMA, Mar. 2002, XP002423351, retrieved from the internet on Mar. 6, 2007, pp. 16-17, 23. http://cp.literature.agilent.com/litweb/pdf/E6474-90042.pdf. Last accessed May 23, 2008, 33 pages.

cdma2000 High Rate Packet Data Air Interface Specification, 3GPP2 C.S0024-A Version 2.0, Jul. 2005, p. 8-97-8-114, URL, http://www.3gpp2.org/Public_html/specs/C.S0024-Av2.0_050727.pdf.

Chinese OA dated Nov. 30, 2010 for CN Applcation Serial No. 200680049404.3, 8 pages.

Chinese OA dated Jan. 19, 2011 for Chinese Application Serial No. 200680049699.4, 11 pages.

Chinese OA dated Jul. 29, 2011 for Chinese Application Serial No. 200680049699.4, 12 pages.

Chinese OA for CN Application No. 200680049464.5, mailed Jan. 10, 2011, 5 pages.

Chinese Office Action dated Nov. 12, 2010 for Chinese Patent Application Serial No. 200680049463.0,7 pages.

Chinese Office Action dated Nov. 9, 2010, mailed Jan. 12, 2011, for Chinese Patent Application Serial No. 200680049589.8,8 pages.

Chinese Office Action dated Dec. 31, 2010, for Chinese Patent Application Serial No. 200680049364.2, 5 pages.

Chinese Office Action dated Apr. 27, 2011 for Chinese Patent Application Serial No. 200680049463.0,7 pages.

Chinese Office Action dated May 31, 2011 for Chinese Patent Application No. 200680049838.3,4 pages.

Chinese Office Action dated Aug. 2, 2011, for Chinese Patent Application Serial No. 200680049364.2, 5 pages.

Chinese Office Action dated Sep. 6, 2011, for Chinese Patent Application Serial No. 200680049464.5, 7 pages.

Chinese Office Action dated Apr. 20, 2011 for CN Application No. 200680049600.0; 11 pages.

Chinese Office Action dated Apr. 26, 2011, for Chinese Patent Application Serial No. 200680049310.6, 6 pages.

Chinese Office Action dated Aug. 18, 2011 for CN Patent Application Serial No. 200680049802.5, 7 pages.

Chinese Office Action dated Aug. 23, 2011 for Chinese Patent Application No. 200680049251.2, 6 pages.

Chinese Office Action dated Aug. 3, 2011 for Chinese Patent Application Serial No. 200680049492.7, 7 pages.

Chinese Office Action dated Dec. 24, 2010 for Chinese Patent Application No. 200680049284.7, 5 pages.

Chinese Office Action dated Dec. 27, 2010 for Chinese Patent Application Serial No. 200680049300.2, 2 pages.

Chinese Office Action dated Dec. 31, 2010 for Chinese Patent Application Serial No. 200680049680.X, 9 pages.

Chinese Office Action dated Feb. 18, 2011 for CN Patent Application Serial No. 200680049802.5, 7 pages.

Chinese Office Action dated Jan. 11, 2011, for Chinese Patent Application Serial No. 200680049428.9, 4 pages.

Chinese Office Action dated Jan. 20, 2011 for Chinese Patent Application No. 200680049251.2.

Chinese Office Action dated Jan. 26, 2011 for Chinese Patent Application U.S. Appl. No. 200680049492.7, 5 pages.

Chinese Office Action dated Jan. 6, 2011 for Chinese Application Serial No. 200680049670.6, 4 pages.

Chinese Office Action dated Jul. 14, 2010, mailed Sep. 27, 2010 for Chinese Patent Application Serial No. 200680049428.9, 4 pages.

Chinese Office Action dated Jun. 27, 2011 for Chinese Patent Application Serial No. 200680049300.2, 4 pages.

Chinese Office Action dated Jun. 29, 2011 for CN Application Serial No. 200680049453.7, 4 pages.

Chinese Office Action dated Mar. 2, 2011 for CN Application Serial No. 200680049453.7, 4 pages.

Chinese Office Action dated May 11, 2011, for Chinese Patent Application Serial No. 200680049428.9,6 pages.

Chinese Office Action dated Oct. 13, 2010, mailed Dec. 7, 2010, for Chinese Patent Application Serial No. 200680049771.3, 11 pages.

Chinese Office Action dated Sep. 6, 2010, for Chinese Patent Application Serial No. 200680049310.6, 5 pages.

Chinese Office Action for Chinese Application No. 200680049812.9 dated Jan. 25, 2011. 11pages.

Chinese Office Action for Chinese Application Serial No. 200680049342.6 dated Apr. 27, 2011, 6 pages.

Chinese Office Action for CN Application No. 200680049744.6 dated Sep. 9, 2010, 4 pages.

Chinese Office Action for CN Application Serial No. 200680049677.8 dated Jan. 26, 2011, 7 pages.

Chinese Office Action for CN Application Serial No. 200680049677.8 dated Jul. 13, 2011, 9 pages.

Chinese Office action mailed Sep. 8, 2010 for Chinese patent application No. 200680049451.8, 2 pages.

Chinese office Action mailed Jun. 22, 2011, for Chinese Patent Application Serial No. 200680049400.5,4 pages.

Chinese Office Action translation for Chinese Patent Application No. 200680049836.4, dated May 17, 2011. 9 pages.

CN OA dated Dec. 31, 2010 for CN Application Serial No. 200680049332.2, 27 pages.

CN OA dated Jul. 22, 2011 for CN Application Serial No. 200680049332.2, 13 pages.

CN OA for Chinese Application No. 200680049630.1 dated Aug. 5, 2011,4 pages.

CN OA for Chinese Application No. 200680049630.1 dated Dec. 31, 2010,7 pages.

CN Office Action dated Aug. 3, 2011 for CN Patent Application Serial No. 200680049352.X, 10 pages.

CN Office Action for Chinese Application No. 200680049752.0 mailed Mar. 23, 2011, pp. 4.

CN Office Action mailed Jan. 6, 2011 for Chinese Patent Application No. 200680049640.5, 5 pages.
CN Office Action mailed Feb. 24, 2011 for Chinese Patent Application Serial No. 200680049352.X, 9 pages.
CN Office Action with English translation for CN application No. 200680049443.3 mailed Jan. 26, 2011, pp. 6.
CN Office Action with English translation for CN application No. 200680049740.8 mailed Mar. 16, 2011, pp. 5.
Damnjanovic and Vanghi, "IS-2000 Enhanced Closed Loop Power Control for Turbo Coding," IEEE 54th Vehicular Technology Proceedings, Oct. 7-11, 2001, pp. 2314-2318, XP-010562383.
English Translation of Japanese Office Action for Japanese Patent Application No. 2008-537984, dated Sep. 13, 2011 7 pages.
English Translation of Japanese Office Action mailed Feb. 22, 2011 for Japanese Patent Application No. 2008-537965.
English Translation of Korean Office Action mailed Aug. 31, 2010 for Korean Patent Application No. 2008-7012604, 3 pages.
English Translation of the Chinese Office Action dated Aug. 31, 2010 for Chinese Patent Application Serial No. 2006-80049431.0, 2 pages.
EP OA dated Oct. 4, 2010 for European Application Serial No. 06827070.1, 4 pages.
EP OA dated Feb. 19, 2009 for EP Application Serial No. 06836638.4-2411 2 11 pages.
EP OA dated Feb. 20, 2009 for EP Application Serial No. 06 827 070.1-2412, 5 pages.
EP OA dated Mar. 17, 2009 for European Application No. 06 826 886.1-2412, 10 pages.
EP OA dated Mar. 17, 2009 for European Application No. 06 827 080.0-2412, 6 pages.
EP OA dated Oct. 4, 2010 for EP Application U.S. Appl. No. 06836638.4, 4 pages.
EP OA for EP Application No. 06826942.2 dated Jan. 25, 2011, 3 pages.
EP OA for EP Application No. 06826942.2 dated Jun. 14, 2011, 5 pages.
EP Office Action for European Patent Application 06836548.5 dated Mar. 3, 2010; pp. 4.
ETS 300744, Digital Video Broadcasting; Framing Structure, Channel Coding, and Modulation for digital Terrestrial Television, European Telecommunication Standards Institute (ETSI), Nov. 1996.
European OA dated Oct. 5, 2010 for European Application Serial No. 06836689.7-2412, 4 pages.
European OA dated Feb. 19, 2009 for European Application Serial No. 06 836 689.7-2412, 6 pages.
European OA dated Feb. 20, 2009 for European Application Serial No. 06 826 915.8-2412, 5 pages.
European OA dated May 14, 2009 for U.S. Appl. No. 06 826 883.8-1237, 4 pages.
European OA dated Sep. 9, 2008 for EP Application Serial No. 06 826 733.5-2412 , 2 pages.
European OA dated May 14, 2009 for EP Application Serial No. 06 827 064A-1237, 4 pages.
European Office Action dated Dec. 19, 2008 for European Application No. 06 817409.3.
European Office Action dated Sep. 24, 2010, for European Patent Application Serial No. 06826919.0, 4 pages.
European Office Action dated Sep. 24, 2010, for European Patent Application Serial No. 06836656.6, 4 pages.
European Office Action dated Aug. 11, 2011 for European Patent Application Serial No. 06826727.7, 6 pages.
European Office Action dated Aug. 11, 2011 for EP Application No. 06817411.9; 7 pages.
European Office Action Dated Aug. 21, 2008 for European Application Serial No. 068271782, 3 pages.
European Office Action dated Dec. 14, 2009, for European Patent Application Serial No. 06826816.8, 2 pages.
European Office Action dated Dec. 18, 2009, for European Patent Application Serial No. 06826807.7, 4 pages.
European Office Action dated Feb. 8, 2011 for EP Application Serial No. 06827064.4, 14 pages.
European Office Action dated Jun. 10, 2010 for European Patent Application Serial No. 06827080.0, 5 pages.
European Office Action dated Sep. 17, 2008, for European Patent Application Serial No. 06826807.7, 6 pages.
European Office Action dated Sep. 24, 2010, for EP Patent Application Serial No. 06826849.9, 4 pages.
European Office Action dated Sep. 24, 2010 for European Patent Application Serial No. 06826918.2, 4 pages.
European Office Action for European Application No. 06827130.3-2412 dated Sep. 24, 2010, 4 pages.
European Office Action for European Patent Application No. 06 817 413.5-2412, dated Aug. 11, 2011.7 pages.
European Office Action from European Application No. 06 827 128.7-2412 dated Aug. 11, 2011.
European Office Action mailed Sep. 24, 2010 for European Patent Application No. 06844225.0, 4 pages.
European Patent Office Action dated Apr. 12, 2010 for EP Application Serial No. 06817409.3, 4 pages.
Harada et al., "Investigations on BLER requirements of associated control channels for IP packet transmission in forward link for VSF-OFCDM broadband packet wireless access", Vehicular Technology Conference, 2004. VTC2004-Fall. 2004 IEEE 60th, Sep. 2004.
IEEE 802.20 Working Group on Mobile Broadband Wireless Access; QFDD and QTDD: Proposed Draft Air Interface Specification; IEEE C802.20-05/69, Oct. 28, 2005, retrieved from the internet on Mar. 5, 2007, pp. 6-43-6-44, XP002425098, http://ieee802.org/20/Contributions.html. Last accessed May 24, 2008, 624 pages.
IEEE: "Draft IEEE Standard for Local and metropolitan area networks, Part 16: Air Interface for Fixed Broadband WirelessAccess-Systems,chapters:6.3.2.3,6.3.15-6.3.17,8.2.1.4-8.2.1.11,8.3.5-8.4.5,8.4.11,11". IEEEP802.16-REVDID5, May 2004, XP002423445.
Japanese OA dated Dec. 21, 2010 for JP Application Serial No. 2008538094, 6 pages.
Japanese OA dated Dec. 7, 2010 for Japanese Application Serial No. 2008-538097, 3 pages.
Japanese OA dated Feb. 22, 2011 for JP Application Serial No. 2008-537946, 4 pages.
Japanese OA dated May 10, 2011 for JP Application Serial No. 2008-538094, 3 pages.
Japanese OA mailed May 31, 2011 for Japanese Application Serial No. 2008-538097 , 2 pages.
Japanese Office Action dated Mar. 1, 2011, for Japanese Patent Application Serial No. 2008-538025, 4 pages.
Japanese Office Action dated Aug. 23, 2011, for Japanese Patent Application Serial No. 2008-538025, 3 pages.
Japanese Office Action dated Aug. 30, 2011 for Japanese Patent Application Serial No. 2008-538023, 3 pages.
Japanese Office Action dated Aug. 16, 2011 for Japanese Patent Application No. 2008-537969, 1 page.
Japanese Office Action dated Dec. 7, 2010 for Japanese Patent Application Serial No. 2008-538002, 3 pages.
Japanese Office Action dated Feb. 15, 2011 for Japanese Patent Application No. 2008-537969.
Japanese Office Action dated Feb. 8, 2011 for Japanese Patent Application Serial No. 2008538082, 3 pages.
Japanese Office Action dated Jan. 18, 2011 for JP Application No. 2008-537970; 5 pages.
Japanese Office Action dated Jan. 25, 2011 for Japanese Patent Application No. 2008537979, 5 pages.
Japanese Office Action dated Jan. 26, 2011, mailed Feb. 1, 2011, for Japanese Patent Application Serial No. 2008-537997, 2 pages.
Japanese Office Action dated Jan. 4, 2011 for Japanese Patent Application Serial No. 2008-537944, 4 pages.
Japanese Office Action dated Jul. 26, 2011 for Japanese Application Serial No. 2008-538106, 4 pages.
Japanese Office Action dated Jun. 21, 2011 for JP Application No. 2008-537970; 3 pages.
Japanese Office Action dated Mar. 1, 2011, for Japanese Patent Application Serial No. 2008-537964, 6 pages.
Japanese Office Action dated Mar. 1, 2011 for Japanese Patent Application Serial No. 2008-538023, 3 pages.
Japanese Office Action dated Mar. 15, 2011 for Japanese Application Serial No. 2008-538106, 5 pages.
Japanese Office Action dated Mar. 15, 2011 for JP Patent Application Serial No. 2008-538022, 5 pages.

Japanese Office Action dated Sep. 6, 2011 for Japanese Patent Application Serial No. 2008538082, 7 pages.
Japanese Office Action for Japanese Application No. 2008-538096 dated Feb. 8, 2011, 6 pages.
Japanese Office Action for Japanese Application Serial No. 2008-537996 dated Mar. 29, 2011, 6 pages.
Japanese Office Action from JP Patent Application No. 2008-538084, dated Aug. 23, 2011. 2 pages.
Japanese Office Action mailed Dec. 7, 2010 for Japanese Patent Application Serial No. 2008-537990,3 pages.
Japanese Office Action mailed Mar. 1, 2011, for JP Patent Application Serial No. 2008-538079, 6 pages.
Japanese Office Action mailed Dec. 21, 2010, for Japanese Patent Application Serial No. 2008-537985, 3 pages.
Jeon, et al., An enhanced channel-quality indication (CQI) reporting scheme for HSDPA systems, IEEE Communication letters, May 2005, vol. 9, pp. 432-434.
Jim Tomcik, "C802.20-05/69: QFDD and QTDD: Proposed Draft Air Interface Specification". Contributions to IEEE 802.20 Session 17: Nov. 14-17, 2005; Oct. 28, 2010; pp. 1-624; XP002423945. http://ieee802.org/20/Contributions.html.
Jim Tomcik, "C80220-05169: QFDD and QTDD: Proposed Draft Air Interface Specification" IEEE : Contributions to IEEE 80220 session 17: Nov. 14-17, 2005 dated Oct. 28, 2005 XP002422600 http://ieee802org/20/Contributions.html Last accessed Mar. 1, 2007.
Jim Tomcik, et al., MBFDD and MBTDD: Proposed Draft Air Interface Specification. IEEE 802.20 Working Group on Mobile Broadband Wireless Access, Jan. 6, 2006; pp. 1-839; XP002426594. http://www.ieee802.org/20/Contribs/C802.20-06-04.pdf.
JP OA dated Mar. 1, 2011 for JP Application Serial No. 2008-538068, 4 pages.
JP OA for Japanese Application No. 2008-538033 dated Feb. 22, 2011, 2 pages.
JP OA mailed Aug. 23, 2011, for JP Application Serial No. 2008538068, 6 pages.
JP Office Action dated Aug. 2, 2011, for Japanese Patent Application No. 2008-538069, 2 pages.
JP Office Action for Japanese Application No. 2008-537980 dated Mar. 29, 2011, 4 pages.
JP Office Action for JP application No. 2008-537956 mailed Dec. 7, 2010, 3 pages.
JP Office Action from Japanese Patent Application No. 2008-538084 dated Mar. 29, 2011, pp. 6.
JP Office Action mailed Jan. 11, 2011 for Japanese Patent Application No. 2008-538069, 3 pages.
JP Office Action mailed Feb. 22, 2011 for Japanese Patent Application Serial No. 2008-537994, 5 pages.
JP Office Action with English translation for JP Application No. 2008-538014 mailed Mar. 15, 2011, pp. 11.
Korean OA Dated Nov. 25, 2009 for KR Application Serial No. 2008-7012719, 4 pages.
Korean OA dated Jan. 26, 2010 for KR Application Serial No. 2008-7012552, 2pages.
Korean OA dated Dec. 9, 2009 for Korean Application Serial No. 2008-7012459, 3 pages.
Korean OA dated May 26, 2010 for Korean Application Serial No. 2008-7012459, 3 pages.
Korean Office Action dated Feb. 26, 2010 for Korean Application No. 2008-7012769, 3 pages.
Korean Office Action dated Feb. 17, 2011 for Korean Patent Application Serial No. 2010-7029654, 3 pages.
Korean Office Action dated Apr. 28, 2010 for Korean Patent Application Serial No. 2008-7012762, 4 pages.
Korean Office Action Dated Apr. 30, 2010 for Korean Application Serial No. 2008-7012462, 3 pages.
Korean Office Action dated Aug. 27, 2010 for Korean Patent Application Serial No. 2008-7012463, 3 pages.
Korean Office Action dated Aug. 27, 2010, for Korean Patent Application Serial No. 2008-7012474, 3 pages.
Korean Office Action dated Aug. 31, 2010 for Korean Patent Application Serial No. 2008-7012754, 3 pages.
Korean Office Action dated Aug. 31, 2010, for KR Patent Application Serial No. 2008-7012554, 3 pages.
Korean Office Action dated Dec. 24, 2009, for Korean Patent Application Serial No. 2008-7012465, 2 pages.
Korean Office Action dated Dec. 29, 2010 for Korean Patent Application Serial No. 2008-7012471, 3 pages.
Korean Office Action dated Dec. 9, 2009 for Korean Patent Application Serial No. 2008-7012471, 3 pages.
Korean Office Action dated Feb. 25, 2010 for Korean Patent Application Serial No. 2008-7012476, 4 pages.
Korean Office Action dated Feb. 25, 2010 for Korean Patent Application Serial No. 2008-7012754, 4 pages.
Korean Office Action dated Feb. 26, 2010, for KR Patent Application Serial No. 2008-7012554, 3 pages.
Korean Office Action dated Jan. 28, 2010 for Korean Patent Application Serial No. 2008-7012463, 4 pages.
Korean Office Action dated Jan. 28, 2010, for Korean Patent Application Serial No. 2008-7012474, 4 pages.
Korean Office Action dated Jan. 29, 2010, for Korean Patent Application Serial No. 2008-7012558, 3 pages.
Korean Office Action dated Jul. 29, 2011 for Korean Patent Application Serial No. 2010-7024469, 3 pages.
Korean Office Action dated Jun. 28, 2010 for Korean Patent Application Serial No. 2008-7012471, 3 pages.
Korean Office Action dated Mar. 30, 2010 for Korean Application No. 2008-7012586; 3 pages.
Korean Office Action Dated March 30, 2010 for Korean Patent, Application Serial No. 2008/7012610, 3 pages.
Korean Office Action dated Sep. 30, 2010 for Korean Application Serial No. 2010-7017046, 4 pages.
Korean Office Action for Korean Application No. 2008-7012687 dated Mar. 31, 2010, 4 pages.
Korean Office Action for Korean Application No. 2008-7012687 dated Sep. 30, 2010, 4 pages.
Korean Office Action for Korean Patent Application 2008-7012453 dated Jan. 27, 2010; pp. 3.
Korean Office Action for KR Application Serial No. 2008-7012764 dated Mar 19, 2010, 4 pages.
Korean Office Action for KR Application Serial No. 2008-7012764 dated Aug. 27, 2010, 3 pages.
Korean Office Action from Korean Patent Application No. 2008-7012724 dated Apr. 27, 2010, pp. 3.
Korowajczuk L., et al, "Designing cdma2000 Systems", John Wiley & Sons, Inc., 2004, 34 pages.
KR OA dated Aug. 25, 2010 for Korean Application Serial No. 2008-7012480, 2 pages.
KR OA dated Jan. 29, 2010 for KR Application Serial No. 2008-7012603, 5 pages.
KR OA dated Jun. 28, 2010 for KR Application Serial No. 2008-7012603, 5 pages.
Liu Dawei, et al., "A New Access Method Used in Beyond 3G Mobile System Using MC-CDMA" in International Conference on Communications, Circuits and Systems and West Sino Expositions, IEEE, 2002. Jun. 29-Jul. 1, 2002, Piscataway, NJ, USA. vol. 1, pp. 170-171, XP010632240, ISBN: 0-7803-7547-5. http://ieeexplore.ieee.org/ie15/8402/26511/01180596.pdf?tp=&arnumber=1180596&isnumber=26511. Last accessed May 23, 2008, 2 pages.
Lucent Technologies: "MIMO system integration and signalling in HSDPA" 3GPP TSG RAN WG1, R1-01-0305, [Online] Feb. 27, 2001, XP002428085 Las Vegas, USA Retrieved from the Internet : URL:www.3gpp.org.
Notice of Grounds for Rejection for Korean Application No. 2008-7012768, dated Oct. 29, 2010 (English Translation).
OA dated Dec. 29, 2008 for European Application Serial No. 06826840.8, 3 pages.
OA dated Feb. 20, 2009 for European Application Serial No. 06 836 598.0-2414, 10 pages.
OA dated Jul. 1, 2009 for Korean Application Serial No. 2008-7012465, 9 pages.
OA mailed Feb. 26, 2010 for Korean Patent Application Serial No. 2008-7012649, 3 pages.
Oa mailed Aug. 31, 2010 for Korean Patent Application Serial No. 2008-7012649, 3 pages.
Office Action dated Jan. 25, 2011 for European Patent Application No. 06826876.2, 3 pages.

Office Action dated Oct. 9, 2010 for Chinese Patent Application No. 200680049399.6, 11 pages.
Office Action dated Mar. 1, 2011 for Japanese Patent Application No. 2008-537995, 4 pages.
Office Action dated Mar. 29, 2011 for Japanese Patent Application No. 2008-537978, 9 pages.
Office Action for Chinese Application No. 200680049394.3 dated Jan. 10, 2011, 8 pages.
Office Action for Chinese Application Serial No. 200680049342.6 dated Jun. 11, 2010, 5 pages.
Office Action for Chinese Patent Application No. 200680049746.5 dated Jan. 26, 2011.
Office Action for Chinese Patent Application No. 200680049746.5 dated Sep. 15, 2011, 5 pages.
Office Action for Korean Application No. 2008-7012761 dated May 19, 2010, 4 pages.
Office Action for Korean Application No. 2008-7012761 dated Nov. 25, 2010, 4 pages.
Office Action for Korean Application Serial No. 2008-7012756 dated Jul. 29, 2010, 2 pages.
Office Action for Korean Patent Application No. 2008-7012556 dated Apr. 30, 2010, 2 pages.
Office Action for Korean Patent Application Serial No. 2008-7012768 dated Apr. 28, 2010, 4 pages.
Office Action mailed Mar. 15, 2010 for Korean Patent Application No. 20087012580, 3 pages.
Office Action mailed Jul. 29, 2010 for Korean Patent Application No. 20087012580, 3 pages.
Office Action mailed Jan. 25, 2010 for Korean Patent Application No. 2008-7012767 3 pages.
Office Action mailed Jan. 25, 2011 for Japanese Patent Application No. 2008-538077, 3 pages.
Office Action mailed Jan. 26, 2010 for Korean Patent Application No. 2008-7012457, 3 pages.
Office Action mailed Jan. 26, 2010 for Korean Patent Application No. 2008-7012467, 5 pages.
Office Action mailed Jan. 26, 2010 for Korean Patent Application No. 2008-7012579, 4 pages.
Office Action mailed Jan. 26, 2010 for Korean Patent Application no. 2008-7012765, 3 pages.
Office Action mailed Jan. 29, 2010 for Korean Patent Application Serial No. 2008-7012464, 5 pages.
Office Action mailed Oct. 30, 2009 for Korean Patent Application No. 2008-7012766, 3 pages.
Office Action mailed Nov. 16, 2009 for Korean Patent Application No. 2008-7012767 3 pages.
Office Action mailed Dec. 14, 2010 for Chinese Patent Application No. 200680049322.9, 5 pages.
Office Action mailed Dec. 18, 2009 for European Patent Application Serial No. 06836601.2, 3 pages.
Office Action mailed Feb. 23, 2010 for Korean Patent Application No. 2008-7012570, 4 pages.
Office Action mailed Feb. 26, 2010 for Korean Patent Application No. 2008-7012460, 4 pages.
Office Action mailed Feb. 26, 2010 for Korean Patent Application No. 2008-7012461, 3 pages.
Office Action mailed Feb. 26, 2010 for Korean Patent Application No. 2008-7012480, 3 pages.
Office Action mailed Feb. 26, 2010 for Korean Patent Application No. 2008-7012604, 4 pages.
Office Action mailed Mar. 10, 2010 for Korean Patent Application No. 2008-7012468, 3 pages.
Office Action mailed Mar. 23, 2010 for Korean Patent Application No. 2008-7012481, 3 pages.
Office Action mailed Apr. 23, 2010 for Korean Patent Application No. 2008-7012767 2 pages.
Office Action mailed Jun. 29, 2010 for Korean Patent Application No. 2008-7012461, 3 pages.
Office Action mailed Aug. 13, 2009 for Korean Patent Application Serial No. 2008-7012757, 3 pages.
Office Action mailed Aug. 2, 2010 for European Patent Application No. 06827064, 8 pages.
Office Action mailed Aug. 27, 2008 for European Patent Application Serial No. 06836601.2, 7 pages.
Office Action mailed Sep. 27, 2010 for Chinese Patent Application No. 200680049453.7, 13 pages.
Office Action mailed Sep. 30, 2010 for Korean Patent Application No. 2008-7012481, 4 pages.
Office Action mailed Mar. 9, 2010 for U.S. Appl. No. 12/091,482, 29 pages.
Office Action mailed May 6, 2011 for Chinese Patent Application No. 200680049640.5, 5 pages.
Office Action mailed Sep. 13, 2010 for U.S. Appl. No. 12/091,482, 20 pages.
Preliminary Notice of Reasons for Rejection for Japanese Application No. 2008-537984, dated Mar. 15, 2011 (English Translation).
QUALCOMM Europe, "Description and link simulations of MIMO schemes for OFDMA based E-UTRA downlink evaluation," 3GPP TSG-RAN WG1#42, R1-050903, Sep. 2, 2005, URL: http://www.3gpp.org/ftp/tsg_ran/WG1_RL1/TSGR1_42/Docs/R1-050903.zip.
Qualcomm Europe, "Qualitative Evaluation of MIMO schemes for OFDM-based E-UTRA downlink," 3GPP TSG-RAN WG1 #42bis, R1-051267, Oct. 14, 2005, URL: http:/www.3gpp.org/ftp/tsg_ran/WG1_RL1/TSGR1_42bis/Docs/R1-051267.zip, 5 pages.
QUALCOMM: "UHDR-One Connection Layer: Registration, Paging and Disc. Features" 3GPP2, [Online] Aug. 25, 2006, pp. 1-17, XP002429007.
Rosenberg, J., et al., "SIP: Session Initiation Protocol ; RFC 3261" Request for Comments: 3261, Jun. 2002, p. 1, 176,177,184-193, XP002423186.
Sandip Sarkar: "Qualcomm Proposal for 3GPP2 Physical Layer; Version 1.0; pp. 1-10, 72-74; C30-20060522-035 QC-Proposal-v1.0" QUALCOMM; 3GPP2, [Online] May 22, 2006, XP002426839.
Soong, A. et al., "Forward High-Speed Wireless Packet Data Service in IS-2000—1xEV-DV," IEEE Communications Magazine, 41 (8), pp. 170-177, Aug. 2003.
Telecommunications Industry Association. "Upper Layer (Layer3) Signaling Standard for cdma2000 Spread Spectrum Systems," TIA/EIA/IS-2000.5-A-1, Nov. 2000, published online at [http://www.tiaonline.org/standards/technology/cdma2000/documents/TIA-EIA-IS-2000-5-A-1.pdf] 11 pages.
Telecommunications Industry Association: Upper Layer (Layer 3) Signaling Standard for CDMA2000 Spread Spectrum Systems, Release C, (186 pages) chapters: 2.6.4.3,2.6.6.2.8,2.73..26..63,. TIA/EIA Interim Standard; TIA/EIA/IS-2000. 5-C, May 2002, XP002423446.
TIA-EIA-IS-856, TIA/EIA Interim Standard, "cdma2000 High Rate Packet Data Air Interface Specification," Telecommunications Industry Association, Nov. 2000.
Translation of Chinese Office Action for Chinese Application U.S. Appl. No. 200680049342.6 dated Jan. 12, 2011, 6 pages.
Translation of Japanese Office Action for Japanese Application Serial No. 2008-538024 dated Feb. 1, 2011.
Translation of Japanese Office Action for JP Application No. 2008-538003, dated Dec. 7, 2010.
Translation of Office Action for Chinese Patent Application No. 200680049832.6 dated Jan. 12, 2011.
Translation of Office Action for Chinese Patent Application No. 200680049832.6 dated Jul. 19, 2011, 4 pages.
Translation of Office Action for Japanese Patent Application No. 2008-538080 dated Mar. 29, 2011.
Translation of Office Action for Japanese Patent Application No. 2008-538081 dated Feb. 8, 2011.
Turner, S. et al., "cdma 2000 Hybrid Access Terminal Operation", Announcement QUALCOMM CDMA Technologies, San Diego, CA, USA, Apr. 9, 2001,pp. 1-25, XP002422171.
U.S. Appl. No. 60/731,037, filed Oct. 27, 2005, entitled "Methods and Apparatus for Providing Mobile Broadband Wireless Higher MAC", 148 pages.
Wonil Roh et. al. : "An Efficient CQICH Signaling for MIMO OFDMA" IEEE 802.16 Broadband Wireless Access Working Group, [Online] Aug. 31, 2004, XP002428096 Retrieved from the Internet : URL : www.ieee802. org/16/>.

* cited by examiner

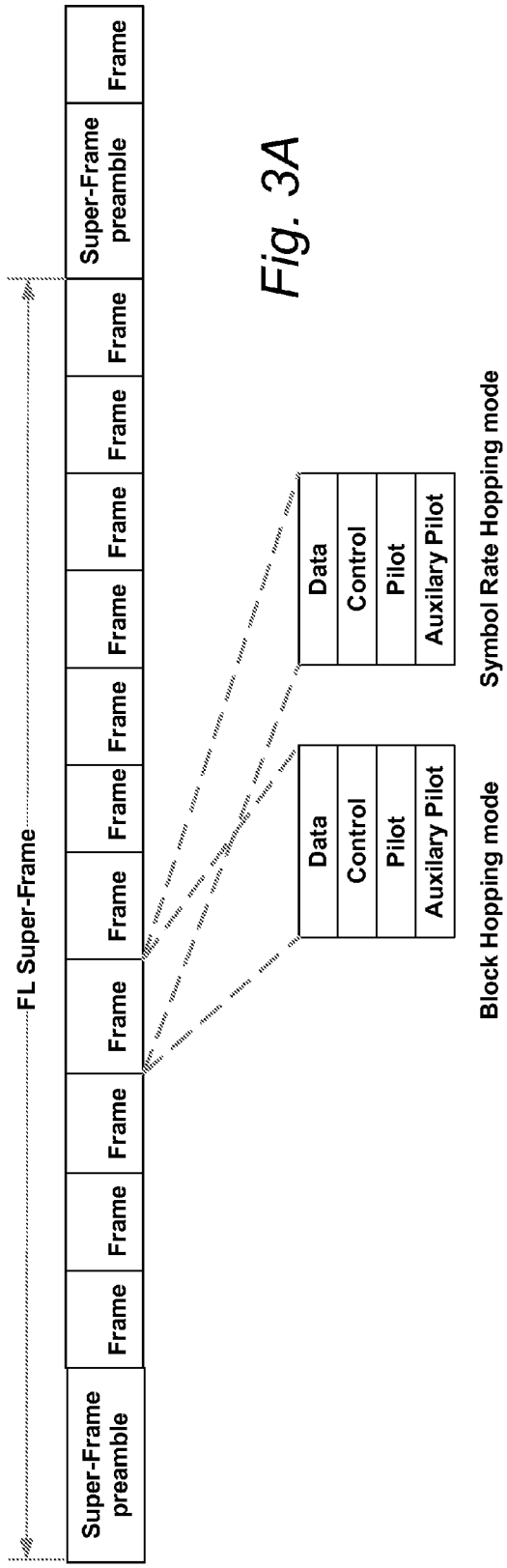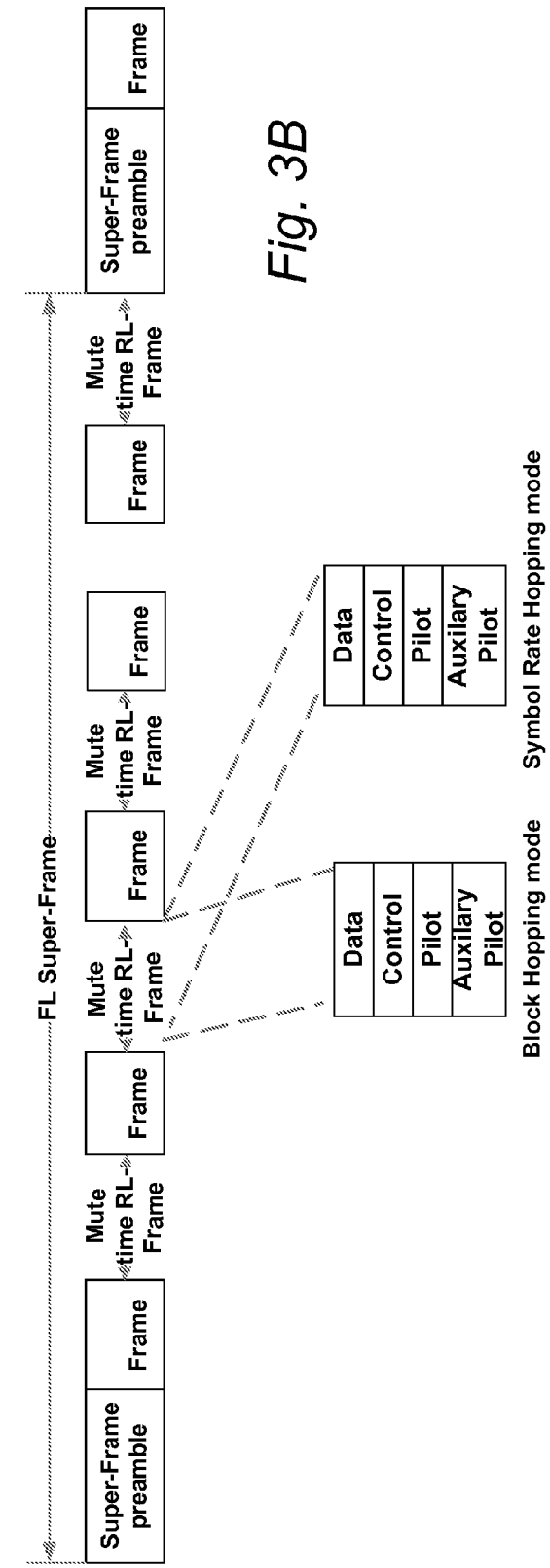

METHOD AND APPARATUS OF ESTABLISHING ACCESS CHANNEL IN WIRELESS COMMUNICATION SYSTEMS

CLAIM OF PRIORITY UNDER 35 U.S.C. §119

The present Application for patent claims priority to Provisional Application Ser. No. 60/731,037, entitled "METHOD AND APPARATUS FOR PROVIDING MOBILE BROADBAND WIRELESS HIGHER MAC", filed Oct. 27, 2005, assigned to the assignee hereof, and expressly incorporated herein by reference.

BACKGROUND

1. Field

The present disclosure relates generally to wireless communication and more particularly to method and apparatus for establishing an access channel.

2. Background

Wireless communication systems have become a prevalent means by which a majority of people worldwide have come to communicate. Wireless communication devices have become smaller and more powerful in order to meet consumer needs and to improve portability and convenience. The increase in processing power in mobile devices such as cellular telephones has lead to an increase in demands on wireless network transmission systems. Such systems typically are not as easily updated as the cellular devices that communicate there over. As mobile device capabilities expand, it can be difficult to maintain an older wireless network system in a manner that facilitates fully exploiting new and improved wireless device capabilities.

Wireless communication systems generally utilize different approaches to generate transmission resources in the form of channels. These systems may be code division multiplexing (CDM) systems, frequency division multiplexing (FDM) systems, and time division multiplexing (TDM) systems. One commonly utilized variant of FDM is orthogonal frequency division multiplexing (OFDM) that effectively partitions the overall system bandwidth into multiple orthogonal subcarriers. These subcarriers may also be referred to as tones, bins, and frequency channels. Each subcarrier can be modulated with data. With time division based techniques, a each subcarrier can comprise a portion of sequential time slices or time slots. Each user may be provided with a one or more time slot and subcarrier combinations for transmitting and receiving information in a defined burst period or frame. The hopping schemes may generally be a symbol rate hopping scheme or a block hopping scheme.

Code division based techniques typically transmit data over a number of frequencies available at any time in a range. In general, data is digitized and spread over available bandwidth, wherein multiple users can be overlaid on the channel and respective users can be assigned a unique sequence code. Users can transmit in the same wide-band chunk of spectrum, wherein each user's signal is spread over the entire bandwidth by its respective unique spreading code. This technique can provide for sharing, wherein one or more users can concurrently transmit and receive. Such sharing can be achieved through spread spectrum digital modulation, wherein a user's stream of bits is encoded and spread across a very wide channel in a pseudo-random fashion. The receiver is designed to recognize the associated unique sequence code and undo the randomization in order to collect the bits for a particular user in a coherent manner.

A typical wireless communication network (e.g., employing frequency, time, and/or code division techniques) includes one or more base stations that provide a coverage area and one or more mobile (e.g., wireless) terminals that can transmit and receive data within the coverage area. A typical base station can simultaneously transmit multiple data streams for broadcast, multicast, and/or unicast services, wherein a data stream is a stream of data that can be of independent reception interest to a mobile terminal. A mobile terminal within the coverage area of that base station can be interested in receiving one, more than one or all the data streams transmitted from the base station. Likewise, a mobile terminal can transmit data to the base station or another mobile terminal. In these systems the bandwidth and other system resources are assigned utilizing a scheduler.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The signals signal formats, signal exchanges, methods, processes, and techniques disclosed herein provide several advantages over known approaches. These include, for example, reduced signaling overhead, improved system throughput, increased signaling flexibility, reduced information processing, reduced transmission bandwidth, reduced bit processing, increased robustness, improved efficiency, and reduced transmission power.

According to an embodiment, a method is provided for establishing an access channel. One embodiment comprises receiving an access grant on the carrier on which the last probe was transmitted and ending access probe transmission upon receiving the AccessGrant. Another embodiment comprises determining expiration of an access grant timer and ending access probe transmission upon the expiration of the timer. Another embodiment comprises receiving an IdleState.IdleHO indication and ending access probe transmission upon receiving the IdleState.IdleHO indication. Yet another embodiment comprises receiving a new AttemptAccess command, wherein the AttemptAccess command is processed after the current probe transmission ends and ending access probe transmission on receiving the new AttemptAccess command.

According to another embodiment, a computer-readable medium is described having a first set of instructions for receiving an access grant on the carrier on which the last probe was transmitted and a second set of instructions for ending access probe transmission upon receiving the AccessGrant. Another aspect of computer-readable medium comprises a first set of instructions for determining expiration of an access grant timer and a second set of instructions for ending access probe transmission upon the expiration of the timer. Another aspect of the medium comprises a first set of instructions for receiving an IdleState.IdleHO indication and a second set of instructions for ending access probe transmission upon receiving the IdleState.IdleHO indication. Yet another aspect of the medium comprises a first set of instructions for receiving a new AttemptAccess command, wherein the AttemptAccess command is processed after the current probe transmission ends and a firsts et of instructions for ending access probe transmission on receiving the new AttemptAccess command.

According to yet another embodiment, an apparatus operable in a wireless communication system is described which includes means for receiving an access grant on the carrier on which the last probe was transmitted and a means for ending access probe transmission upon receiving the AccessGrant. Another aspect of the apparatus comprises a means for determining expiration of an access grant timer and a means for ending access probe transmission upon the expiration of the timer. Another aspect of the apparatus comprises a means for receiving an IdleState.IdleHO indication and a means for ending access probe transmission upon receiving the IdleState.IdleHO indication. Yet another aspect of the apparatus comprises means for receiving a new AttemptAccess command, wherein the AttemptAccess command is processed after the current probe transmission ends and a means for ending access probe transmission on receiving the new AttemptAccess command To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects may be employed and the described aspects are intended to include all such aspects and their equivalents.

BRIEF DESCRIPTION OF THE DRAWINGS

FIGS. 3A and 3B illustrate aspects of superframe structures for a multiple access wireless communication system.

DETAILED DESCRIPTION

Figure 1:
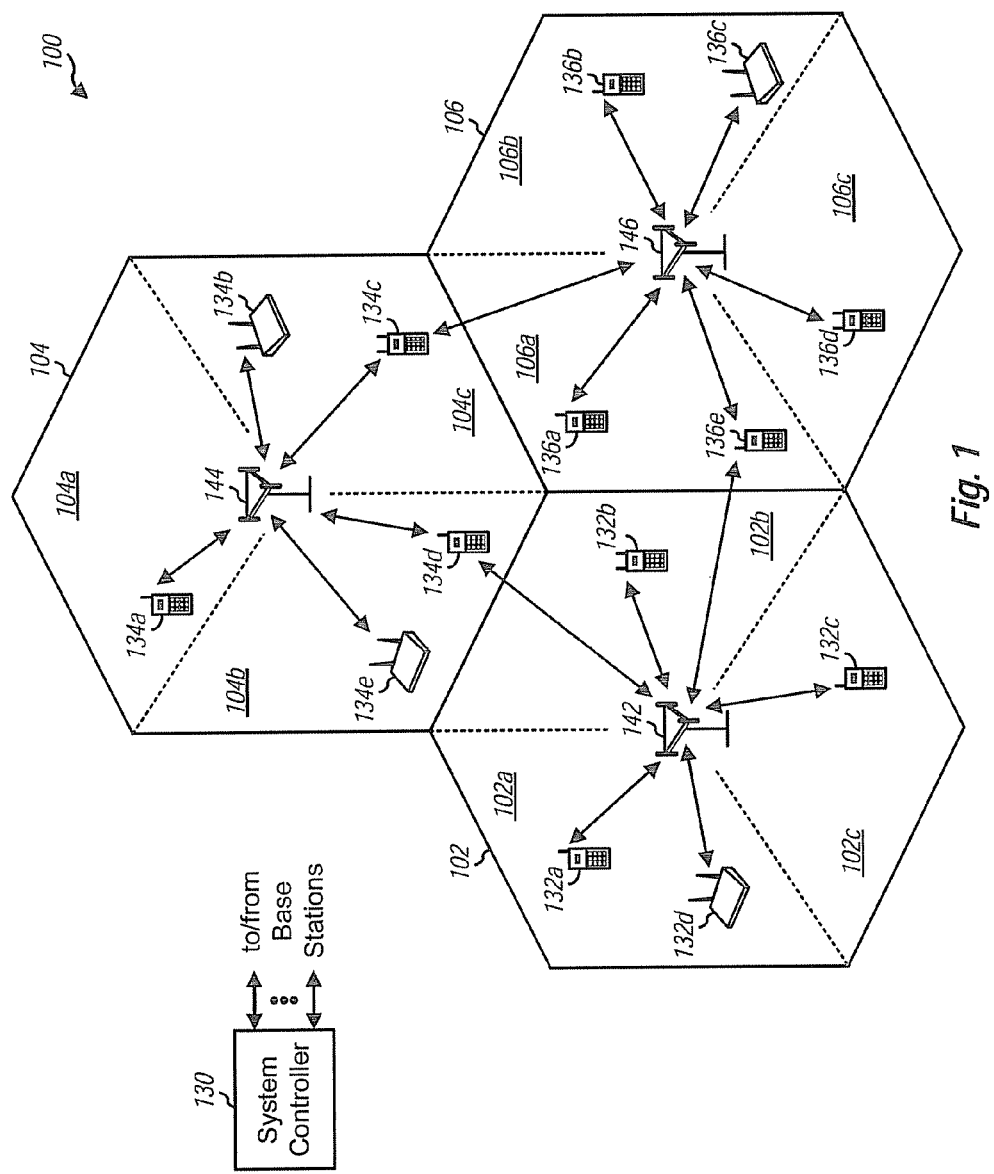
FIG. 1 illustrates aspects of a multiple access wireless communication system.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Referring to FIG. 1, a multiple access wireless communication system according to one aspect is illustrated. A multiple access wireless communication system 100 includes multiple cells, e.g. cells 102, 104, and 106. In the aspect of FIG. 1, each cell 102, 104, and 106 may include an access point 142, 144, and 146 that includes multiple sectors. The multiple sectors are formed by groups of antennas of a base station each responsible for communication with access terminals in a portion of the cell. In cell 102, access point 142 has sectors 102*a*, 102*b*, and 102*c*. In cell 104, access point 144 has sectors 104*a*, 104*b*, and 104*c*. In cell 106, access point 146 has sectors 106*a*, 106*b*, and 106*c*.

Each cell includes several access terminals which are in communication with one or more sectors of each access point. For example, access terminals 132*a*-132*d*, 134*d*, and 136*e* are in communication with base station 142, access terminals 134*a*-134*e* are in communication with access point 144, and access terminals 136*a*-136*e* and 134*c* are in communication with access point 146.

Each cell includes several access terminals which are in communication with one or more sectors of each access point. For example, access terminals 130 and 132 are in communication base 142, access terminals 134 and 136 are in communication with access point 144, and access terminals 138 and 140 are in communication with access point 146.

Controller 130 is coupled to each of the cells 102, 104, and 106. Controller 130 may contain one or more connections to multiple networks, e.g. the Internet, other packet based networks, or circuit switched voice networks that provide information to, and from, the access terminals in communication with the cells of the multiple access wireless communication system 100. The controller 130 includes, or is coupled with, a scheduler that schedules transmission from and to access terminals. In other aspects, the scheduler may reside in each individual cell, each sector of a cell, or a combination thereof.

As used herein, an access point may be a fixed station used for communicating with the terminals and may also be referred to as, and include some or all the functionality of, a base station, a Node B, or some other terminology. An access terminal may also be referred to as, and include some or all the functionality of, a user equipment (UE), a wireless communication device, terminal, a mobile station or some other terminology.

It should be noted that while FIG. 1, depicts physical sectors, i.e. having different antenna groups for different sectors, other approaches may be utilized. For example, utilizing multiple fixed "beams" that each cover different areas of the cell in frequency space may be utilized in lieu of, or in combination with physical sectors. Such an approach is depicted and disclosed in copending U.S. patent application Ser. No. 11/260,895, entitled "Adaptive Sectorization In Cellular System."

Figure 2:
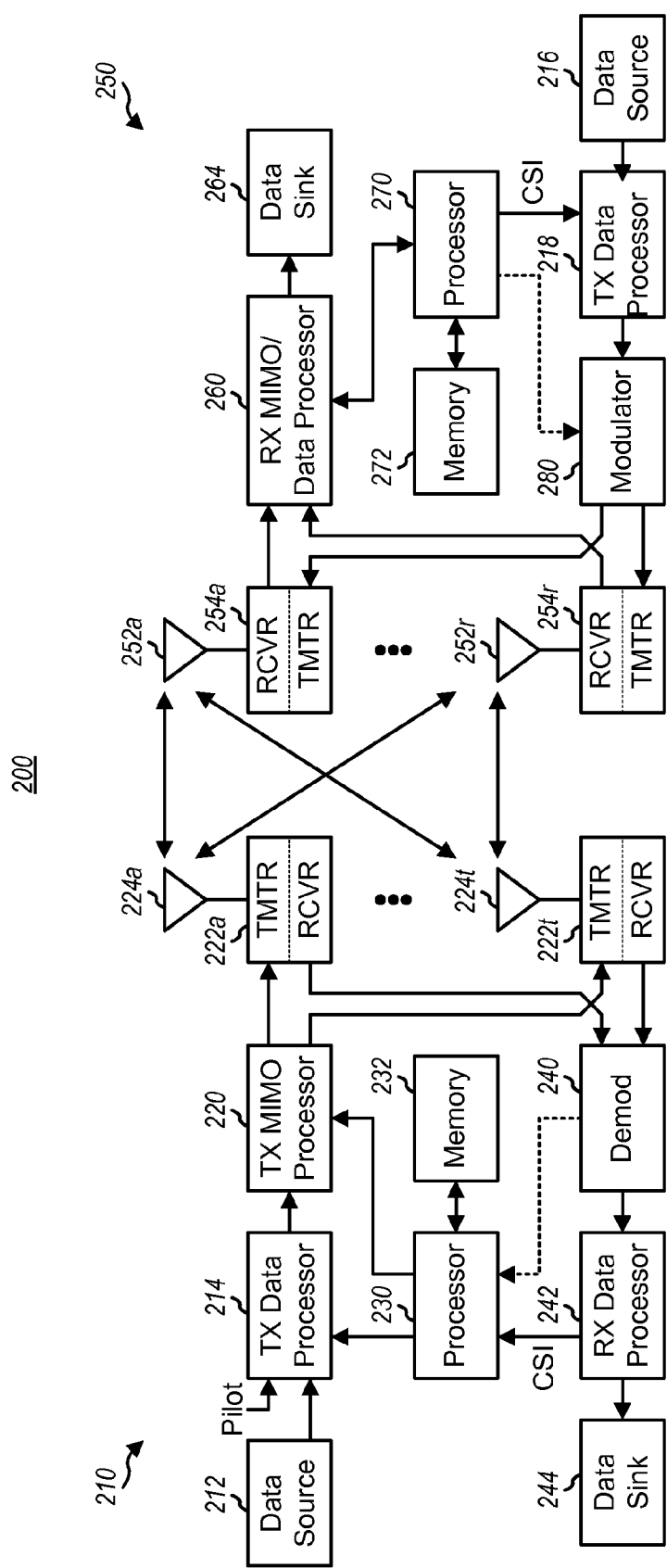
FIG. 2 illustrates aspects of a transmitter and receiver in a multiple access wireless communication system.

Referring to FIG. 2, a block diagram of an aspect of a transmitter system 210 and a receiver system 250 in a MIMO system 200 is illustrated. At transmitter system 210, traffic data for a number of data streams is provided from a data source 212 to transmit (TX) data processor 214. In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM, or other orthogonalization or non-orthogonalization techniques. The pilot data is typically a known data pattern that is processed in a known manner and may be used at the receiver system to estimate the channel response. The multiplexed pilot and coded data for each data stream is then modulated (i.e., symbol mapped) based on one or more particular modulation schemes (e.g., BPSK, QSPK, M-PSK, or M-QAM) selected for that data stream to provide modulation symbols. The data rate, coding, and modulation for each data stream may be determined by instructions performed on provided by processor 230.

The modulation symbols for all data streams are then provided to a TX processor 220, which may further process the modulation symbols (e.g., for OFDM). TX processor 220 then provides $N_T$ modulation symbol streams to $N_T$ transmitters (TMTR) 222a through 222t. Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The processing by RX data processor 260 is described in further detail below. Each detected symbol stream includes symbols that are estimates of the modulation symbols transmitted for the corresponding data stream. RX data processor 260 then demodulates, deinterleaves, and decodes each detected symbol stream to recover the traffic data for the data stream. The processing by RX data processor 218 is complementary to that performed by TX processor 220 and TX data processor 214 at transmitter system 210.

RX data processor 260 may be limited in the number of subcarriers that it may simultaneously demodulate, e.g. 512 subcarriers or 5 MHz, and such a receiver should be scheduled on a single carrier. This limitation may be a function of its FFT range, e.g. sample rates at which the processor 260 may operate, the memory available for FFT, or other functions available for demodulation. Further, the greater the number of subcarriers utilized, the greater the expense of the access terminal.

The channel response estimate generated by RX processor 260 may be used to perform space, space/time processing at the receiver, adjust power levels, change modulation rates or schemes, or other actions. RX processor 260 may further estimate the signal-to-noise-and-interference ratios (SNRS) of the detected symbol streams, and possibly other channel characteristics, and provides these quantities to a processor 270. RX data processor 260 or processor 270 may further derive an estimate of the "operating" SNR for the system. Processor 270 then provides channel state information (CSI), which may comprise various types of information regarding the communication link and/or the received data stream. For example, the CSI may comprise only the operating SNR. In other aspects, the CSI may comprise a channel quality indicator (CQI), which may be a numerical value indicative of one or more channel conditions. The CSI is then processed by a TX data processor 278, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to recover the CSI reported by the receiver system. The reported CSI is then provided to processor 230 and used to (1) determine the data rates and coding and modulation schemes to be used for the data streams and (2) generate various controls for TX data processor 214 and TX processor 220. Alternatively, the CSI may be utilized by processor 270 to determine modulation schemes and/or coding rates for transmission, along with other information. This may then be provided to the transmitter which uses this information, which may be quantized, to provide later transmissions to the receiver.

Processors 230 and 270 direct the operation at the transmitter and receiver systems, respectively. Memories 232 and 272 provide storage for program codes and data used by processors 230 and 270, respectively.

At the receiver, various processing techniques may be used to process the $N_R$ received signals to detect the $N_T$ transmitted symbol streams. These receiver processing techniques may be grouped into two primary categories (i) spatial and space-time receiver processing techniques (which are also referred to as equalization techniques); and (ii) "successive nulling/equalization and interference cancellation" receiver processing technique (which is also referred to as "successive interference cancellation" or "successive cancellation" receiver processing technique).

While FIG. 2 discusses a MIMO system, the same system may be applied to a multi-input single-output system where multiple transmit antennas, e.g. those on a base station, transmit one or more symbol streams to a single antenna device, e.g. a mobile station. Also, a single output to single input antenna system may be utilized in the same manner as described with respect to FIG. 2.

The transmission techniques described herein may be implemented by various means. For example, these techniques may be implemented in hardware, firmware, software, or a combination thereof. For a hardware implementation, the processing units at a transmitter may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, processors, other electronic units designed to perform the functions described herein, or a combination thereof. The processing units at a receiver may also be implemented within one or more ASICs, DSPs, processors, and so on.

For a software implementation, the transmission techniques may be implemented with modules (e.g., procedures, functions, and so on) that perform the functions described herein. The software codes may be stored in a memory (e.g., memory 230, 272x or 272y in FIG. 2) and executed by a processor (e.g., processor 232, 270x or 270y). The memory may be implemented within the processor or external to the processor.

It should be noted that the concept of channels herein refers to information or transmission types that may be transmitted by the access point or access terminal. It does not require or utilize fixed or predetermined blocks of subcarriers, time periods, or other resources dedicated to such transmissions.

Referring to FIGS. 3A and 3B, aspects of superframe structures for a multiple access wireless communication system are illustrated. FIG. 3A illustrates aspects of superframe structures for a frequency division duplexed (FDD) multiple access wireless communication system, while FIG. 3B illustrates aspects of superframe structures for a time division duplexed (TDD) multiple access wireless communication system. The superframe preamble may be transmitted separately for each carrier or may span all of the carriers of the sector.

In both FIGS. 3A and 3B, the forward link transmission is divided into units of superframes. A superframe may consist of a superframe preamble followed by a series of frames. In an FDD system, the reverse link and the forward link transmission may occupy different frequency bandwidths so that transmissions on the links do not, or for the most part do not, overlap on any frequency subcarriers. In a TDD system, N forward link frames and M reverse link frames define the number of sequential forward link and reverse link frames that may be continuously transmitted prior to allowing transmission of the opposite type of frame. It should be noted that the number of N and M may be vary within a given superframe or between superframes.

In both FDD and TDD systems each superframe may comprise a superframe preamble. In certain aspects, the superframe preamble includes a pilot channel that includes pilots that may be used for channel estimation by access terminals, a broadcast channel that includes configuration information that the access terminal may utilize to demodulate the information contained in the forward link frame. Further acquisition information such as timing and other information sufficient for an access terminal to communicate on one of the carriers and basic power control or offset information may also be included in the superframe preamble. In other cases, only some of the above and/or other information may be included in this superframe preamble.

As shown in FIGS. 3A and 3B, the superframe preamble is followed by a sequence of frames. Each frame may consist of a same or a different number of OFDM symbols, which may constitute a number of subcarriers that may simultaneously utilized for transmission over some defined period. Further, each frame may operate according to a symbol rate hopping mode, where one or more non-contiguous OFDM symbols are assigned to a user on a forward link or reverse link, or a block hopping mode, where users hop within a block of OFDM symbols. The actual blocks or OFDM symbols may or may not hop between frames.

Figure 4:
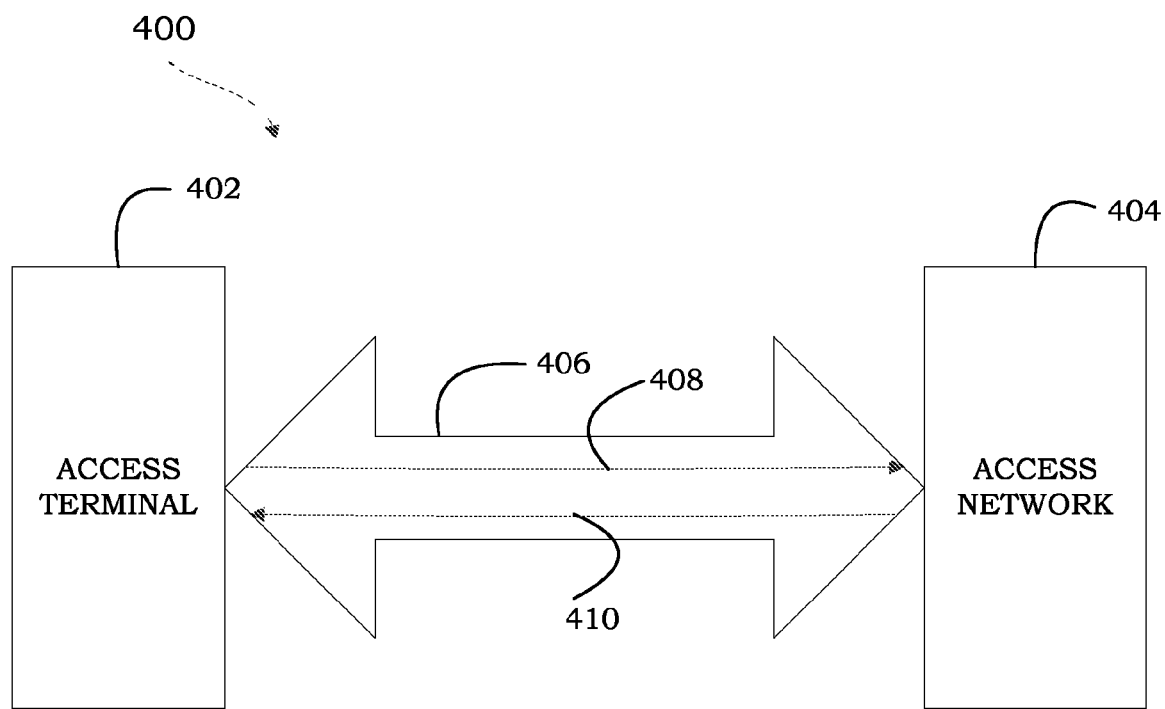
FIG. 4 illustrates communication between an access terminal and an access network.

FIG. 4 illustrates the process by which an access terminal 402 probes an access network 404 for establishing an access channel 406. The access terminal 402 sends an access probe 408 to the access network 404 to acquire the access channel 406 and the access network 404 responds with an Access-Grant message 410 to allot the access channel 406 to the access terminal 402. The procedures and methods required to transmit access probe 408 by the access terminal 402 or to receive the access probe 408 at access network 404 is controlled by Default Access Channel MAC protocol. Similarly, the messages and procedures for AccessGrant 410 sent by the access network 404 are controlled by the Shared Signaling MAC protocol. The communication link between the access network and the access terminal may be implemented using communication protocols/standards such as World Interoperability for Microwave Access (WiMAX), infrared protocols such as Infrared Data Association (IrDA), short-range wireless protocols/technologies, Bluetooth® technology, ZigBee® protocol, ultra wide band (UWB) protocol, home radio frequency (HomeRF), shared wireless access protocol (SWAP), wideband technology such as a wireless Ethernet compatibility alliance (WECA), wireless fidelity alliance (Wi-Fi Alliance), 802.11 network technology, public switched telephone network technology, public heterogeneous communications network technology such as the Internet, private wireless communications network, land mobile radio network, code division multiple access (CDMA), wideband code division multiple access (WCDMA), universal mobile telecommunications system (UMTS), advanced mobile phone service (AMPS), time division multiple access (TDMA), frequency division multiple access (FDMA), orthogonal frequency division multiple (OFDM), orthogonal frequency division multiple access (OFDMA), orthogonal frequency division multiple FLASH (OFDM-FLASH), global system for mobile communications (GSM), single carrier (IX) radio transmission technology (RTT), evolution data only (EV-DO) technology, general packet radio service (GPRS), enhanced data GSM environment (EDGE), high speed downlink data packet access (HSPDA), analog and digital satellite systems, and any other technologies/protocols that may be used in at least one of a wireless communications network and a data communications network.

Figure 5A:
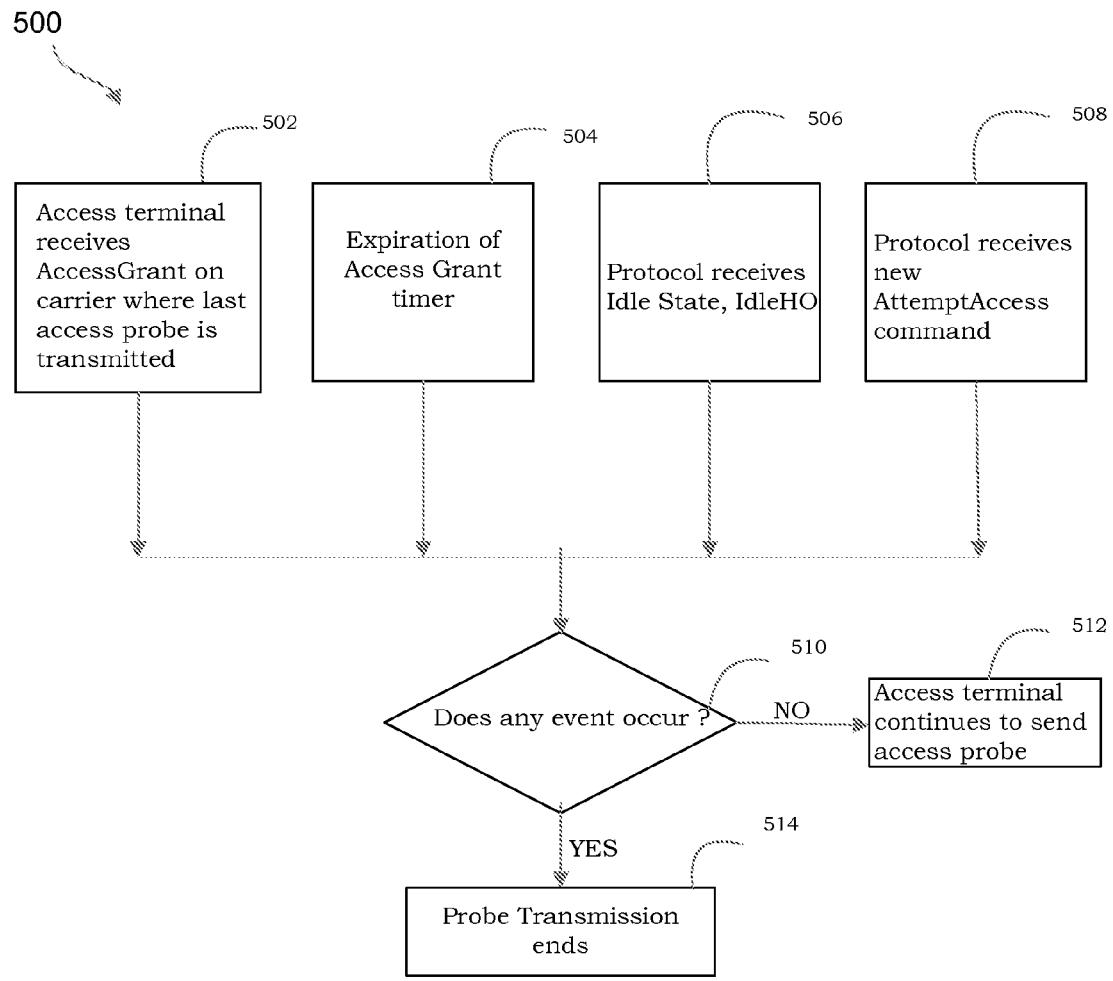
FIG. 5A illustrates a flow diagram of a process by access terminal.

FIG. 5A illustrates a flow diagram of process 500, according to an embodiment. The process is invoked by an access terminal for ending an existing probe transmission, while it is processing an AttemptAccess command. This may occur if any of the following events occur. At 502, the access terminal receives an access grant, through SSMAC AccessGrantReceived indication on the carrier on which the last probe was transmitted. At 504, the expiration of access grant timer is determined. At 506, the protocol receives an Idlestate.IdleHO indication and at 508, the protocol receives a new AttemptAccess command, wherein the command is processed after the current probe transmission ends. At 510, it is determined if any of the listed events occur and at 514 the probe transmission is ended, if any of the events occur otherwise at 512, the access terminal continues to send the access probe.

Figure 5B:
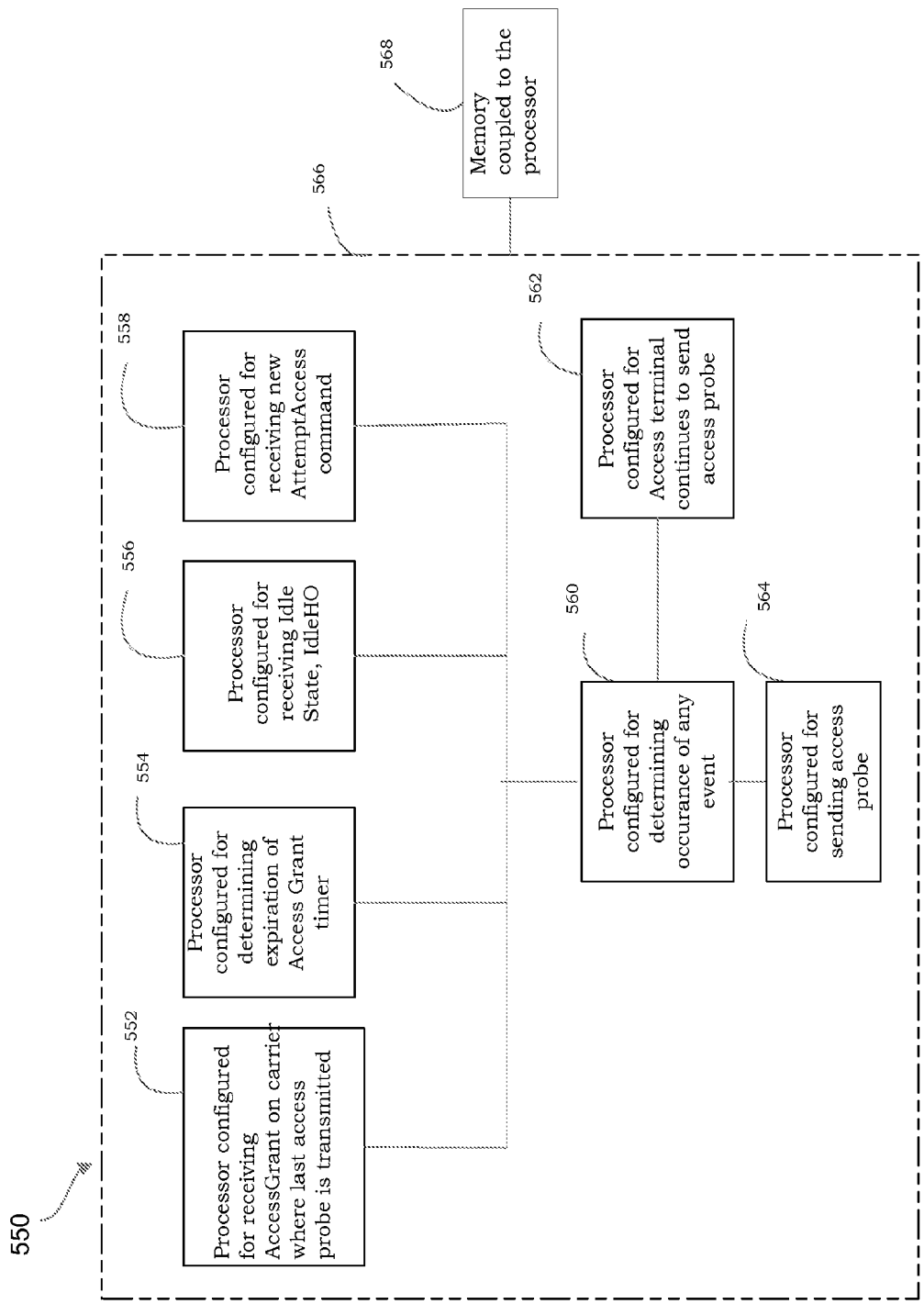
FIG. 5B illustrates a module for establishing an access channel by an access terminal.

FIG. 5B illustrates a processor 550 for establishing an access channel. The processors referred to may be electronic devices and may comprise one or more processors configured for establishing the channel according to the embodiment. A processor 552 is configured for receiving an access grant, through SSMAC AccessGrantReceived indication on the carrier on which the last probe was transmitted. A processor 554 is configured for determining the expiration of access grant timer. A processor 556 is configured for receiving an Idlestate.IdleHO indication and a processor 558 is configured for receiving a new AttemptAccess command, wherein the command is processed after the current probe transmission ends. A processor 560 is configured for determining if any of the listed events occur and a processor 564 is configured for ending the probe transmission, if any of the events occur otherwise a processor 562 is configured for sending the access probe. The functionality of the discrete processors 552 to 564 depicted in the figure may be combined into a single processor 566. A memory 568 is also coupled to the processor 566.

In an embodiment, an apparatus is described which includes means for receiving an access grant, through SSMAC AccessGrantReceived indication on the carrier on which the last probe was transmitted, a means for determining the expiration of access grant timer, a means for receiving an Idlestate.IdleHO indication and a means for receiving a new AttemptAccess command, wherein the command is processed after the current probe transmission ends. A means is further provided for determining if any of the listed events occur and a means is provided for ending the probe transmission, if any of the events occur otherwise a means is provided for sending the access probe. The means described herein may comprise one or more processors.

Furthermore, embodiments may be implemented by hardware, software, firmware, middleware, microcode, or any combination thereof. When implemented in software, firmware, middleware or microcode, the program code or code segments to perform the necessary tasks may be stored in a machine readable medium such as a separate storage(s) not shown. A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Various modifications to these aspects will be readily apparent to those skilled in the art, and the generic principles defined herein may be applied to other aspects. Thus, the description is not intended to be limited to the aspects shown herein but is to be accorded the widest scope consistent with the principles and novel features disclosed herein.

I claim:

1. A method of establishing an access channel in a wireless communication system, comprising:
    determining by an access terminal whether an access grant is received on a carrier on which an access probe of a current AttemptAccess command was transmitted;
    determining by the access terminal whether an access grant timer has expired;
    determining by the access terminal whether an IdleState.IdleHO indication is received;
    determining by the access terminal whether a new AttemptAccess command is received during processing of the current AttemptAccess command, wherein the new AttemptAccess command is processed after a probe transmission of the current AttemptAccess command ends; and
    ending further transmission of the current AttemptAccess command access probe if any of the determining whether an access grant is received, the determining whether an access grant timer has expired, the determining whether an IdleState.IdleHO indication is received, or the determining whether a new AttemptAccess command is received results in a positive determination.

2. A non-transitory computer-readable medium comprising computer executable instructions that, in response to execution, cause at least one computing device to perform operations comprising:
    determining whether an access grant is received on a carrier on which an access probe of a current AttemptAccess command was transmitted;
    determining whether an access grant timer has expired;
    determining whether an IdleState.IdleHO indication is received;
    determining whether a new AttemptAccess command is received during processing of the current AttemptAccess command, wherein the new AttemptAccess command is processed after a probe transmission of the current AttemptAccess command ends; and
    ending further transmission of the current AttemptAccess command access probe if any of the determining whether an access grant is received, the determining whether an access grant timer has expired, the determining whether an IdleState.IdleHO indication is received, or the determining whether a new AttemptAccess command is received results in a positive determination.

3. An apparatus operable in a wireless communication system, the apparatus comprising:
    means for determining whether an access grant is received on a carrier on which the an access probe of a current AttemptAccess command was transmitted;
    means for determining whether an access grant timer has expired;
    means for determining whether an IdleState.IdleHO indication is received;
    means for determining whether a new AttemptAccess command is received during processing of the current AttemptAccess command, wherein the new AttemptAccess command is processed after a probe transmission of the current AttemptAccess command ends; and
    means for ending further transmission of the current AttemptAccess command access probe if any of the determining whether an access grant is received, the determining whether an access grant timer has expired, the determining whether an IdleState.IdleHO indication is received, or the determining whether a new AttemptAccess command is received results in a positive determination.

4. A system for establishing an access channel in a wireless communication system, comprising:
    a processor configured to:
    determine whether an access grant is received on a carrier on which an access probe of a current AttemptAccess command was transmitted;
    determine whether an access grant timer has expired;
    determine whether an IdleState.IdleHO indication is received;
    determine whether a new AttemptAccess command is received during processing of the current AttemptAccess command, wherein the new AttemptAccess command is processed after a probe transmission of the current AttemptAccess command ends; and
    end further transmission of the current AttemptAccess command access probe if any of the determining whether an access grant is received, the determining whether an access grant timer has expired, the determining whether an IdleState.IdleHO indication is received, or the determining whether a new AttemptAccess command is received results in a positive determination.

5. The method of claim 1, wherein the current AttemptAccess command was transmitted and the access grant is received under control of a Default Access Channel MAC (Media Access Control) protocol.

6. The method of claim 1, wherein a message for communicating the access grant is controlled by a Shared Signaling MAC (Media Access Control) protocol.

7. The method of claim 1, further comprising:
    continuing, by the access terminal, to transmit the current AttemptAccess command on the carrier if none of the determining whether an access grant is received, the determining whether an access grant timer has expired, the determining whether an IdleState.IdleHO indication is received, or the determining whether a new AttemptAccess command is received results in a positive determination.

8. The computer-readable medium of claim 2, wherein the current AttemptAccess command is transmitted and the access grant is received under control of a Default Access Channel MAC (Media Access Control) protocol.

9. The computer-readable medium of claim 2, wherein a message for communicating the access grant is controlled by a Shared Signaling MAC (Media Access Control) protocol.

10. The computer-readable medium of claim 2, further comprising:
    continuing to transmit the current AttemptAccess command on the carrier if none of the determining whether an access grant is received, the determining whether an access grant timer has expired, the determining whether an IdleState.IdleHO indication is received, or the determining whether a new AttemptAccess command is received results in a positive determination.

11. The apparatus of claim 3, wherein the current AttemptAccess command was transmitted and the access grant is received under control of a Default Access Channel MAC (Media Access Control) protocol.

12. The apparatus of claim 3, wherein a message for communicating the access grant is controlled by a Shared Signaling MAC (Media Access Control) protocol.

13. The apparatus of claim 3, further comprising:
means for continuing to transmit the current AttemptAccess command on the carrier if none of the determining whether an access grant is received, the determining whether an access grant timer has expired, the determining whether an IdleState.IdleHO indication is received, or the determining whether a new AttemptAccess command is received results in a positive determination.

14. The system of claim 4, wherein the current AttemptAccess command was transmitted and the access grant is received under control of a Default Access Channel MAC (Media Access Control) protocol.

15. The system of claim 4, wherein a message for communicating the access grant is controlled by a Shared Signaling MAC (Media Access Control) protocol.

16. The system of claim 4, wherein the processor is further configured to:
continue to transmit the current AttemptAccess command on the carrier if it is determined that none of an access grant is received, an access grant timer has expired, an IdleState.IdleHO indication is received, and a new AttemptAccess command is received.

* * * * *